(12) United States Patent
Peard et al.

(10) Patent No.: US 12,481,476 B2
(45) Date of Patent: Nov. 25, 2025

(54) METHOD AND SYSTEM FOR VOLUME CONTROL

(71) Applicant: Apple Inc., Cupertino, CA (US)

(72) Inventors: Ross B. Peard, San Jose, CA (US); Pratik Shah, Milpitas, CA (US)

(73) Assignee: Apple Inc., Cupertino, CA (US)

(*) Notice: Subject to any disclaimer, the term of this patent is extended or adjusted under 35 U.S.C. 154(b) by 121 days.

(21) Appl. No.: 17/848,319

(22) Filed: Jun. 23, 2022

(65) Prior Publication Data

US 2023/0008865 A1 Jan. 12, 2023

Related U.S. Application Data

(60) Provisional application No. 63/220,928, filed on Jul. 12, 2021.

(51) Int. Cl.
*G06F 3/16* (2006.01)
*H04R 3/12* (2006.01)

(52) U.S. Cl.
CPC ............ *G06F 3/165* (2013.01); *H04R 3/12* (2013.01); *H04R 2420/03* (2013.01); *H04R 2420/07* (2013.01); *H04R 2430/01* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 9,300,268 B2 | 3/2016 | Chen et al. | |
| 10,103,702 B2 | 10/2018 | Putta et al. | |
| 10,461,712 B1 | 10/2019 | Yang et al. | |
| 10,466,959 B1* | 11/2019 | Yang | H03G 7/002 |
| 10,574,804 B2 | 2/2020 | Bullough et al. | |
| 2006/0252470 A1 | 11/2006 | Seshadri et al. | |
| 2007/0078543 A1 | 4/2007 | Wakefield | |

(Continued)

FOREIGN PATENT DOCUMENTS

| CN | 112104950 A | 12/2020 |
|---|---|---|
| WO | 2016209607 A1 | 12/2016 |

OTHER PUBLICATIONS

Combined Search and Examination Report under Sections 17 & 18(3) for GB Patent Application No. GB2209790.1, dated Dec. 1, 2022, 3 pages.

(Continued)

*Primary Examiner* — Walter F Briney, III
(74) *Attorney, Agent, or Firm* — Aikin & Gallant, LLP

(57) ABSTRACT

A method performed by a first electronic device, the method includes, while engaged in a call with a second electronic device, initiating a joint media playback session in which the first and second electronic devices independently stream media content for synchronous playback; driving a speaker with a mix of a downlink signal of the call and an audio signal of the media content at an overall volume level; receiving a user-adjustment at a single volume control for the first electronic device to reduce the overall volume level; in response to the user adjustment, applying a first gain adjustment to the downlink signal and a second gain adjustment to the audio signal; and driving the speaker with a mix of the downlink signal and the audio signal at the reduced volume level.

20 Claims, 6 Drawing Sheets

(56) References Cited

U.S. PATENT DOCUMENTS

| | | | |
|---|---|---|---|
| 2008/0130924 A1 | 6/2008 | Vaudrey et al. | |
| 2016/0036962 A1 | 2/2016 | Rand | |
| 2016/0249145 A1 | 8/2016 | Ohl et al. | |
| 2016/0379660 A1* | 12/2016 | Wright | H04M 3/568 381/57 |
| 2017/0026509 A1* | 1/2017 | Rand | G10L 25/78 |
| 2017/0142511 A1 | 5/2017 | Dennis | |
| 2018/0286424 A1* | 10/2018 | Fadell | G10L 21/0224 |
| 2019/0355384 A1 | 11/2019 | Sereshki et al. | |

OTHER PUBLICATIONS

Search Report under Section 17 for GB Patent Application No. GB2209790.1, dated Nov. 30, 2022, 1 page.

* cited by examiner

METHOD AND SYSTEM FOR VOLUME CONTROL

CROSS-REFERENCE TO RELATED APPLICATION

This application claims the benefit of and priority to U.S. Provisional Patent Application Ser. No. 63/220,928 filed Jul. 12, 2021, which is hereby incorporated by this reference in its entirety.

FIELD

An aspect of the disclosure relates to an audio system that controls volume. Other aspects are also described.

BACKGROUND

Many devices today, such as a smartphone, are capable of various types of telecommunication with other devices. For example, a smartphone may perform a phone call with another device. When a telephone number is dialed, the smartphone connects to a cellular network, which may then connect the smartphone with another device (e.g., another smart phone or a landline). In addition, the smartphone may also be able to conduct a video conference call in which video data and audio data are exchanged with another device.

SUMMARY

An aspect of the disclosure is a method performed by a first electronic device (e.g., a local device). For instance, while engaged in a (e.g., telephony (or "audio only") or video) call with a second electronic device (e.g., a remote device), the local device initiates a joint media playback session in which both devices independently stream media content for synchronous playback. The local device drives a speaker with a mix of a downlink signal of the call and an audio signal of the media content at an overall volume level. The local device receives a user-adjustment at a single volume control (e.g., a master volume control) for the local device to reduce the overall volume level, and in response to the user-adjustment, applies a first gain adjustment to the downlink signal and a second gain adjustment to the audio signal, and drives the speaker with a mix of the signals at a reduced volume level.

In one aspect, the single volume control is a master volume control of the first electronic device that is configured to provide bi-directional control for either incrementally increasing or decreasing the overall volume level. In another aspect, the master volume control is a physical control that is a part of the first electronic device. In some aspects, the master volume control is a user interface (UI) item that is displayed on a display screen of the first electronic device. In one aspect, the single volume control is an input including a gesture made by a user of the first electronic device.

In one aspect, the single volume control includes several volume settings, each volume setting defining a different overall volume level of the first electronic device, the user-adjustment at the single volume control changes a current volume setting of the signal volume control to a new volume setting that is associated with the reduced overall volume level. In some aspects, the downlink signal is associated with a first volume-to-gain curve that associates the plurality of volume settings to a first plurality of gains and the audio signal of the media content is associated with a second volume-to-gain curve that associates the plurality of volume settings to a second plurality of gains, the method further includes, in response to receiving the user-adjustment, using the first volume-to-gain curve to determine the first gain adjustment based on a first gain that is associated with the new volume setting, and using the second volume-to-gain curve to determine the second gain adjustment based on a second gain that is associated with the new volume setting. In some aspects, the first and second volume-to-gain curves are linear functions of gain with respect to the plurality of volume settings of the single volume control, the first volume-to-gain curve has a greater slope than a slope of the second volume-to-gain curve such that at each volume setting a gain on the first volume-to-gain curve is lower than a gain on the second volume-to-gain curve. In one aspect, the first and second volume-to-gain curves are non-linear functions of gain with respect to volume settings of the single volume control.

In one aspect, prior to the applying of the first and second gain adjustments the audio signal has a greater signal level than a signal level of the downlink signal, the second gain adjustment is greater than the first gain adjustment such that 1) a signal level of a gain-adjusted audio signal and a signal level of a gain-adjusted downlink signal are lower than the signal level of the downlink signal and 2) the signal level of the gain-adjusted downlink signal is greater than the signal level of the gain-adjusted audio signal. In another aspect, the user-adjustment is a first user-adjustment, the first gain adjustment is a first attenuation, and the second gain adjustment is a second attenuation, the method further includes receiving a second user-adjustment of the single volume control for the first electronic device to increase the reduced overall volume level back to the overall volume level; applying 1) a first gain to the gain-adjusted downlink signal and 2) a second gain to the gain-adjusted audio signal, the first and second gains increase signals levels of the gain-adjusted downlink signal and audio signal, respectively.

In one aspect, the first gain is proportional to the first attenuation and the second gain is proportional to the second attenuation. In another aspect, the second gain increases a signal level of the gain-adjusted audio signal more than the second attenuation reduced a signal level of the audio signal when applied in response to receiving the first user-adjustment. In some aspects, when the second user-adjustment of the single volume control increases the overall volume level of the first electronic device to a maximum volume level, the applied second gain increases the signal level of the gain-adjusted audio signal higher than the applied first gain increase the signal level of the gain-adjusted downlink signal. In one aspect, the method further includes determining the first and second gain adjustments based on the streamed media content of the joint media playback session. In some aspects, determining the first and second gain adjustments includes using the user-adjustment at the single volume control to perform a table lookup into a data structure that associates, for different user-adjustments, a gain for the downlink signal and a gain for the audio signal of the streamed media content.

In one aspect, the method further includes determining whether a microphone signal produced by a microphone of the first electronic device includes speech of a user of the first electronic device based on output from a voice activity detector (VAD), the first gain adjustment and the second gain adjustment are applied to the downlink signal and the audio signal, respectively, in response to determining that the microphone signal includes the speech. In one aspect, the first gain adjustment is different than the second gain adjustment. In some aspects, the method further includes, in response to determining that the microphone signal does not include speech the first and second gain adjustments are the same. In another aspect, the first gain adjustment and the second gain adjustment are applied in response to the microphone including speech for a period of time before the user-adjustment is received at the volume control.

In one aspect, the application of the first and second gain adjustments reduce signal levels of the downlink signal and audio signal, respectively, the method further includes prior to receiving the user-adjustment, determining whether the downlink signal of the call includes speech based on output from a voice activity detector (VAD); and in response to determining that the downlink signal includes speech, applying a third gain adjustment to the audio signal to reduce a signal level of the audio signal. In another aspect, the second gain adjustment reduces the signal level of the audio signal more when the downlink signal includes speech than when the downlink signal does not include speech. In some aspects, the downlink signal is a first downlink signal, the method further includes while engaged in the call and the joint media playback session with the second electronic device and a third electronic device, receiving the first downlink signal from the second electronic device, a second downlink signal from the third electronic device, and the audio signal of the media content; in response to the user-adjustment, applying the first gain adjustment to the first downlink signal, the second gain adjustment to the audio signal, and a third gain adjustment to the second downlink signal, the third gain adjustment adjusts a signal level of the second downlink signal differential than the first gain adjustment adjusts a signal level of the first downlink signal.

According to another aspect of the disclosure, a method performed by the local device includes initiating a call with a remote device, and during the call, initiating a joint media playback session in which both devices independently stream media content on a display of the local device. The local device receives 1) a downlink signal associated with the call and 2) an audio signal associated with the media content. The local device receives a user-adjustment of a volume control and based on the user-adjustment, applies 1) a first gain adjustment to the downlink signal and 2) a second gain adjustment that is different than the first gain adjustment to the audio signal. The local device drives a speaker with the downlink signal and the audio signal.

In one aspect, the audio signal is a first audio signal, the method further includes displaying visual content of an extended reality (XR) presentation on the display of the first electronic device; driving the speaker with a mixed signal including the downlink signal, the first audio signal associated with the media content, and a second audio signal of an object of the XR presentation; and determining the first and second gain adjustments based on the object within the XR presentation. In another aspect, in response to receiving the user-adjustment of the volume control, applying a third gain adjustment to the second audio signal of the object of the XR presentation. In some aspects, determining the first and second gain adjustments includes, determining, using sensor data from one or more sensors of the first electronic device, that the user wants sound of the object to be emphasized over sound contained within the downlink signal and the first audio signal, the first gain adjustment and the second gain adjustment attenuate the downlink signal and the first audio signal, respectively, more than the third gain adjustment attenuates the second audio signal.

In one aspect, determining that the user intends to emphasize the sound of the object includes determining that a gaze of at least one eye of the user is focused on the object within the XR presentation. In another aspect, the sensor data is motion data produced by a motion sensor of the first electronic device, determining that the user intends to emphasize the sound of the object includes determining, based on the motion data, that a user of the first electronic device is tilting the display screen about a center axis that runs through the display screen in a direction towards the object displayed on the display screen with respect to the center axis.

In one aspect, the call is initiated by a telephony application that is being executed by the first electronic device, the audio signal is a first audio signal from a media application that is being executed by the first electronic device that, the method further includes receiving a second audio signal from a separate application that is being executed by the first electronic device; determining the first gain adjustment, the second gain adjustment, and a third gain adjustment to be applied to the downlink signal, the first audio signal, and the second audio signal, respectively, based on an order of which the first electronic device begins to execute the telephony application, the media application, and the separate application. In another aspect, the second audio signal is attenuated less than at least one of the first audio signal and the downlink signal.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1:
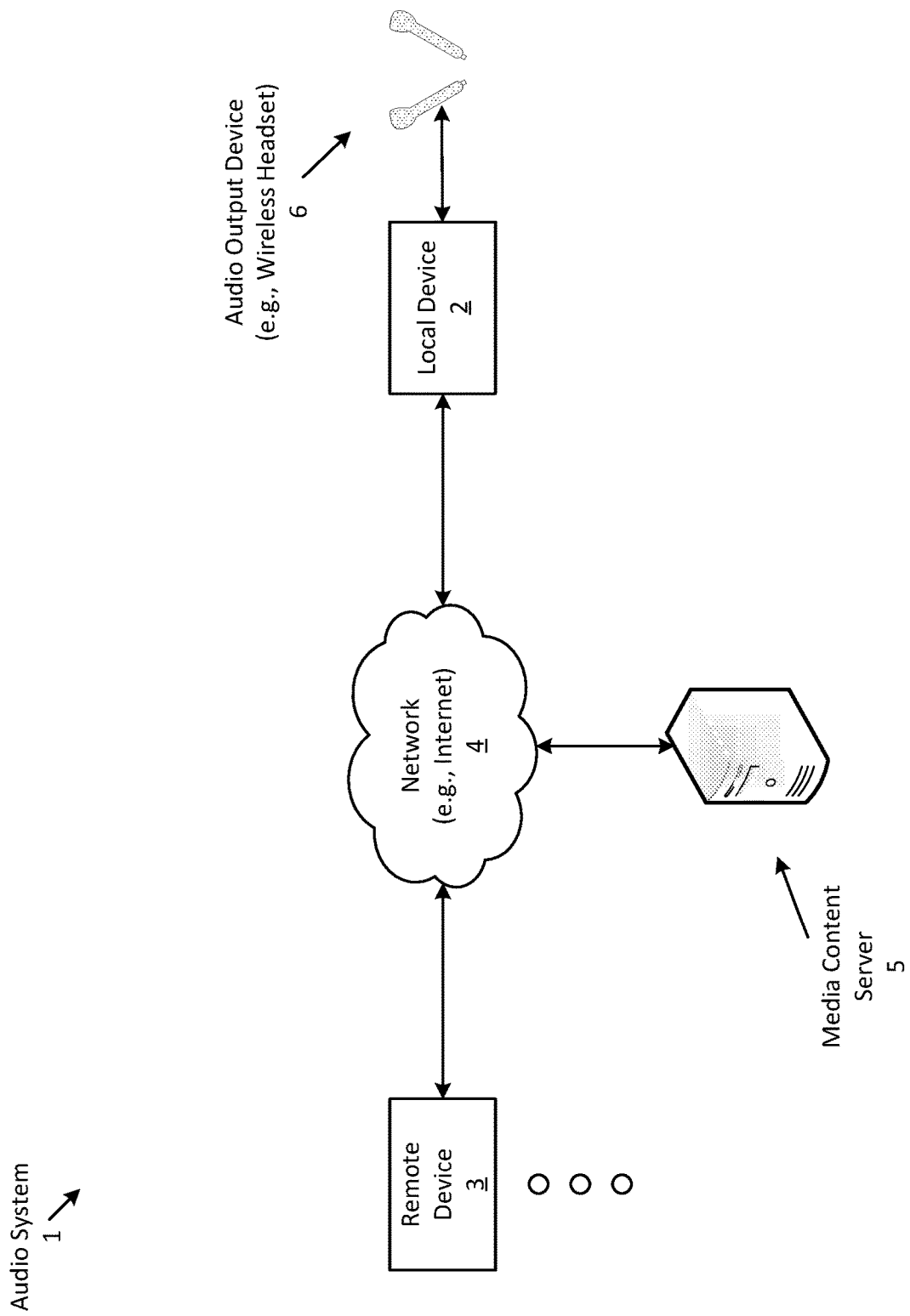
FIG. 1 shows an audio system that includes a local device and one or more remote devices that engage in a call while performing a joint media playback session according to one aspect.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

In one aspect, an extended reality (XR) environment (setting or presentation) refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). Examples of mixed realities include augmented reality and augmented virtuality. An augmented reality (AR) environment refers to a simulated environment in which one or more virtual objects are superimposed over a physical environment, or a representation thereof.

There are many different types of electronic systems that enable a person to sense and/or interact with various XR environments. Examples include head mounted systems (or head mounted devices (HMDs)), projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 shows an audio system 1 that includes a local device and one or more remote devices that engage in a call while performing a joint media playback session according to one aspect. As described herein, this may allow users of the devices to listen to (and/or watch) media content (e.g., on the devices) while participating in a conversation with one another. The audio system includes a local (or first electronic) device 2, a remote (or second electronic) device 3, a network 4 (e.g., a computer network, such as the Internet), a media content server 5, and an (e.g., optional) audio output device 6. In one aspect, the system may include more or less elements. For example, the audio system may not include an audio output device (and/or the output device may be a part of (or integrated) into the local device. In the case in which the audio system does not include an audio output device, the local device may perform audio signal processing and/or audio output operations (e.g., driving one or more speakers of the local device to output sound), as described herein. In one aspect, the system may have one or more remote devices, where all of the devices are engaged in the (e.g., conference) call and the joint media playback session with one another and with the local device, as described herein. In another aspect, the audio system may include one or more remote (electronic) servers that are communicatively coupled with at least some of the devices of the audio system 1, and may be configured to perform at least some of the operations described herein.

In one aspect, the local device (and/or the remote device) may be any electronic device (e.g., with electronic components, such as a processor, memory, etc.) that is capable of engaging in a call, such as a telephony ("voice-only" or "audio-only) call) or a video (e.g., conference) call, while performing a joint media playback session with one or more other devices (e.g., one or more remote devices) in which (at least some of) the devices (e.g., simultaneously) playback media content. For example, the media content may include a musical composition, a movie, etc., of which the local device and one or more remote devices may simultaneously play back, while engaged in a call. As a result, users of the devices may be able to hear sounds (and/or see images or video) of the media and/or hear sounds (and/or see images or video) of the (video) call (e.g., simultaneously). In some aspects, the media content may be interactive content, such as a video game in which users of the local and remote device(s) participant. In another aspect, the media content may include an XR environment in which each device that is engaged within the joint media playback session may participate. For example, the local device may participate in the XR environment by displaying image data of the XR environment on one or more display screens and using one or more audio signals that include sounds of the XR environment to drive one or more speakers of the local device.

As described herein, an XR environment (or presentation) refers to a wholly or partially simulated environment that people sense and/or interact with via an electronic device. For example, the XR environment may include AR content, MR content, VR content, and/or the like. There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

In some aspects, the local device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch. In one aspect, the remote device(s) may be the same type of device as the local device (e.g., both devices being smart phones). In another aspect, at least some of the remote devices may be different, such as some being desktop computers, while others are smart phones.

As illustrated, the local device 2 is (e.g., communicatively) coupled to the remote device 3 and/or the media content server 5 via the computer network (e.g., Internet) 4. Specifically, the local and remote devices may be configured to establish and engage in a telephony (or voice-only) call in which the devices that are engaged within the call exchange audio data. For instance, each device transmits at least one microphone signal as an uplink audio signal to the other devices engaged in the call, and receives at least one audio signal as a downlink audio signal from the other devices for playback by one or more speakers. In one aspect, the network may include a Public Switched Telephone Network (PSTN), over which the local device and the remote device(s) may be capable of placing outgoing calls and/or receiving incoming calls. In another aspect, the local device may be configured to establish an Internet Protocol (IP) telephony (or Voice over IP (VoIP)) call with one or more remote devices via the network (e.g., the Internet). In particular, the local device may use any signaling protocol (e.g., Session Initiation Protocol (SIP)) to establish a communication session and use any communication protocol (e.g., Transmission Control Protocol (TCP), Real-time Transport Protocol (RTP), etc.) to exchange audio data during a call. For example, when a call is initiated (e.g., by a telephony application (e.g., application 29 shown in FIG. 2) executing within the local device), the local device may transmit one or more microphone signals captured by one or more microphones (e.g., as an uplink audio signal) as audio data (e.g., in IP packets) to one or more remote devices, and receive one or more (e.g., downlink audio) signals from the remote devices for driving one or more speakers of the local device, via the network. In another aspect, the local device may be configured to establish a wireless (e.g., cellular) call. In which case, the network 4 may include one or more cell towers, which may be part of a communication network (e.g., a 4G Long Term Evolution (LTE) network) that supports data transmission (and/or voice calls) for electronic devices, such as mobile devices (e.g., smartphones).

In another aspect, the local and remote devices may be configured to establish and engage in a video call with one or more remote devices 3. In which case, the local device may establish the video call (e.g., similarly to a VoIP, using SIP to initiate the session and RTP to transmit data), and when established exchange video and/or audio data with one or more remote devices. For instance, the local device may include one or more cameras which capture video that is encoded using any video codec (e.g., H.264), and transmitted to the remote devices for decoding and display on one or more display screens. More about calls is described herein.

In some aspects, the media content server 5 may be a stand-alone server computer or a cluster of server computers configured to stream media content to electronic devices, such as the local and remote devices. In which case, the server may be a part of a cloud computing system that is capable of streaming data as a cloud-based service that is provided to one or more subscribers (e.g., of the local and/or remote device(s)). In some aspects, the server may be configured to stream any type of media (or multi-media) content, such as audio content (e.g., musical compositions, audiobooks, podcasts, etc.), still images, video content (e.g., movies, television productions, etc.), etc. In one aspect, the server may use any audio and/or video encoding format and/or any method for streaming the content to one or more devices.

In one aspect, the media content server 5 may be configured to simultaneously stream media content to one or more devices in order to allow the devices to engage in a joint media playback session. For example, the server may receive a request from a device (e.g., local device 2) to stream a piece of media content that may include audio content (e.g., a musical composition) and/or video content (e.g., a video signal associated with a movie) with another device (e.g., remote device 3). In one aspect, the request may be transmitted by the local device (and/or the remote device(s)) in response to the device receiving user input to begin to playback the media content. In which case, the server may establish a communication link with both the local device and the remote device(s) that are already engaged in a (e.g., telephony and/or video) call. Once established, the server may encode audio content using any codec (e.g., MP3, AAC, etc.) and/or may encode video content using any codec, and transmit the encoded content to each device to be decoded and output. In another aspect, the local device may transmit a message to the remote device, requesting to initiate a joint media playback session. In response, the remote device may communicate with the media content server to retrieve the media content and to synchronize playback with the local device. In one aspect, devices that participate within the joint media playback session may output media content in sync, such that the content is output and experienced by users at the same time. In some aspects, any timing synchronization method may be used (e.g., by the devices participating within the session and/or the server) to ensure that the media is streamed simultaneously and in sync. More about the joint media playback session is described herein.

As illustrated, the audio output device 6 may be any electronic device that includes at least one speaker and is configured to output sound by driving the speaker. For instance, as illustrated the device is a wireless headset (e.g., in-ear headphones or earbuds) that are designed to be positioned on (or in) a user's ears, and are designed to output sound into the user's ear canal. In some aspects, the earphone may be a sealing type that has a flexible ear tip that serves to acoustically seal off the entrance of the user's ear canal from an ambient environment by blocking or occluding in the ear canal. As shown, the output device includes a left earphone for the user's left ear and a right earphone for the user's right ear. In this case, each earphone may be configured to output at least one audio channel of media content (e.g., the right earphone outputting a right audio channel and the left earphone outputting a left audio channel of a two-channel input of a stereophonic recording, such as a musical work). In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the audio output device may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

In one aspect, the output device may be a wireless device that may be communicatively coupled to the local device in order to exchange audio data. For instance, the local device may be configured to establish the wireless connection with the audio output device via a wireless communication protocol (e.g., BLUETOOTH protocol or any other wireless communication protocol). During the established wireless connection, the local device may exchange (e.g., transmit and receive) data packets (e.g., Internet Protocol (IP) packets) with the audio output device, which may include audio digital data in any audio format. In particular, the local device may be configured to establish and communicate with the audio output device over a bi-directional wireless audio connection (e.g., which allows both devices to exchange audio data), for example to conduct a hands-free call or to use voice commands. Examples of a bi-directional wireless communication protocol include, without limitation the Hands-Free Profile (HFP) and the Headset Profile (HSP), both of which are BLUETOOTH communication protocols. In another aspect, the local device may be configured to establish and communication with the output device over a uni-directional wireless audio connection, such as (e.g., Advanced Audio Distribution Profile (A2DP) protocol), which allows the local device to transmit audio data to one or more audio output devices. More about these wireless audio connections is described herein.

In another aspect, the local device 2 may communicatively couple with the audio output device 6 via other methods. For example, both devices may couple via a wired connection. In this case, one end of the wired connection may be (e.g., fixedly) connected to the audio output device, while another end may have a connector, such as a media jack or a universal serial bus (USB) connector, which plugs into a socket of the audio source device. Once connected, the local device may be configured to drive one or more speakers of the audio output device with one or more audio signals, via the wired connection. For instance, the local device may transmit the audio signals as digital audio (e.g., PCM digital audio). In another aspect, the audio may be transmitted in analog format.

In some aspects, the local device 2 and the audio output device 6 may be distinct (separate) electronic devices, as shown herein. In another aspect, the local device may be a part of (or integrated with) the audio output device. For example, as described herein, at least some of the components of the local device (such as a controller) may be part of the audio output device, and/or at least some of the components of the audio output device may be part of the local device. In this case, each of the devices may be communicatively coupled via traces that are a part of one or more printed circuit boards (PCBs) within the audio output device.

Figure 2:
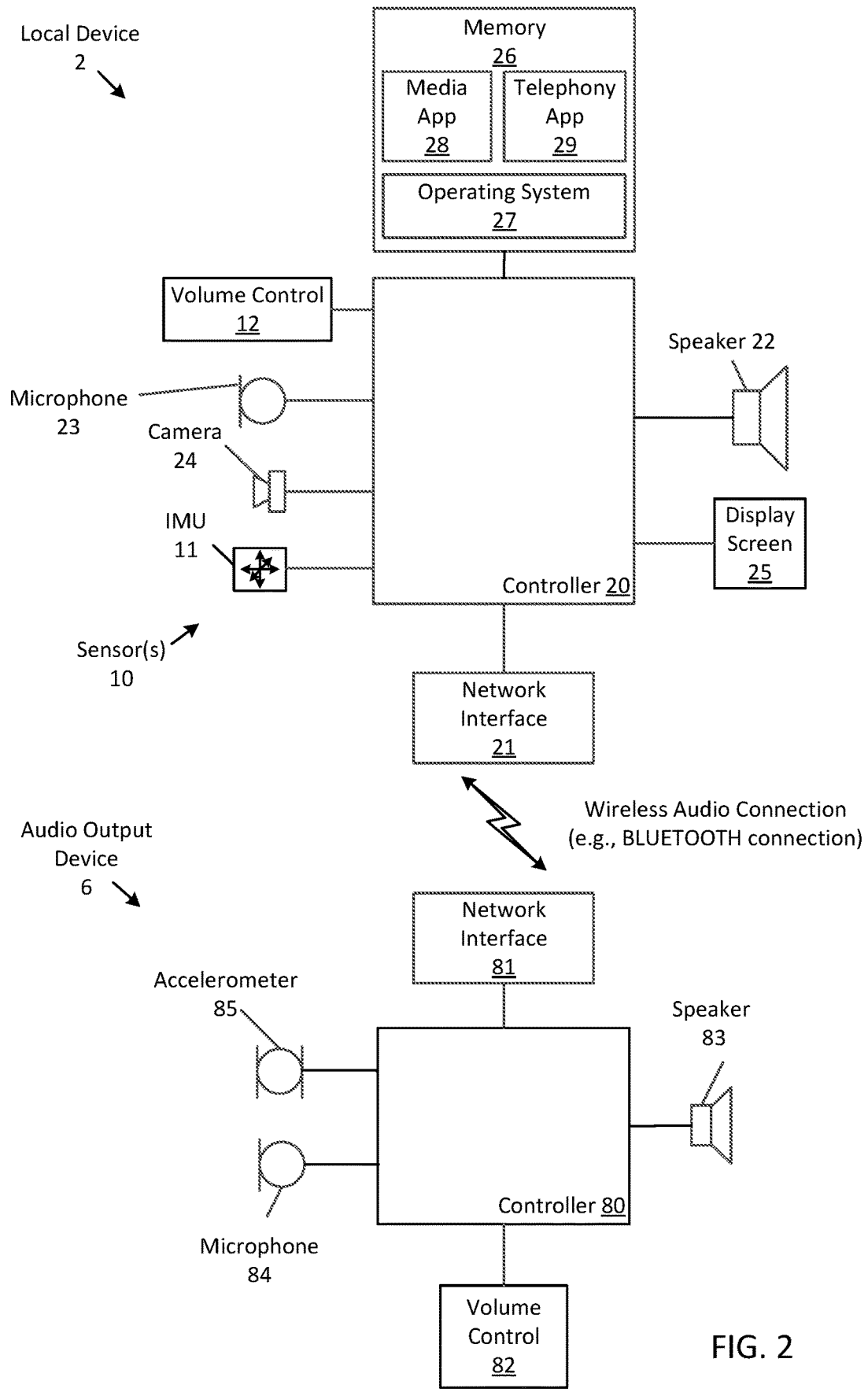
FIG. 2 shows a block diagram of the local device that initiates a joint playback media session while engaged in a call with the one or more remote devices, and of an audio output device that wirelessly communicates with the local device according to one aspect.

FIG. 2 shows a block diagram of the local device 2 that initiates a joint playback media session while engaged in a (e.g., voice or video) call with the one or more remote devices 3, and shows of an audio output device 6 that wirelessly communicates with the local device according to one aspect. The local device 2 includes a controller 20, a network interface 21, a speaker 22, a display screen (or display) 25, memory 26, a volume control 12, and one or more sensors 10, which include a microphone 23, a camera 24, an inertial measurement unit (IMU) 11. In one aspect, the local device may include more or less elements as described herein. For instance, the device may include two or more of at least some of the elements, such as having two or more microphones 23 and/or two or more speakers 22.

In one aspect, the one or more sensors 10 are configured to detect the environment (e.g., in which the local device is located) and produce sensor data based on the environment. For instance, the camera 24 is a complementary metal-oxide-semiconductor (CMOS) image sensor that is capable of capturing digital images including image data that represent a field of view of the camera 24, where the field of view includes a scene of an environment in which the device 2 is located. In some aspects, the camera may be a charged-coupled device (CCD) camera type. The camera is configured to capture still digital images and/or video that is represented by a series of digital images. In one aspect, the camera may be positioned anywhere about/on the local device. In some aspects, the device may include multiple cameras (e.g., where each camera may have a different field of view).

The microphone 23 may be any type of microphone (e.g., a differential pressure gradient micro-electro-mechanical system (MEMS) microphone) that is configured to convert acoustical energy caused by sound wave propagating in an acoustic environment into an input microphone signal. In some aspects, the microphone may be an "external" (or reference) microphone that is arranged to capture sound from the acoustic environment. In another aspect, the microphone may be an "internal" (or error) microphone that is arranged to capture sound (and/or sense pressure changes) inside a user's ear (or ear canal). The IMU is configured to produce motion data that indicates the position and/or orientation of the local device. In one aspect, the local device may include additional sensors, such as (e.g., optical) proximity sensors that are designed to produce sensor data that indicates an object is at a particular distance from the sensor (and/or the local device).

In one aspect, the sensors 10 may be a part of (or integrated into) the local device. In another aspect, sensors may be separate electronic devices that are communicatively coupled with the controller (e.g., via the network interface 21).

The speaker 22 may be an electrodynamic driver that may be specifically designed for sound output at certain frequency bands, such as a woofer, tweeter, or midrange driver, for example. In one aspect, the speaker 22 may be a "full-range" (or "full-band") electrodynamic driver that reproduces as much of an audible frequency range as possible. In some aspects, the local device may include one or more speakers, where at least some of the speakers may be the same or different (e.g., one being a woofer while another is a tweeter).

The display screen 25 is designed to present (or display) digital images or videos of video (or image) data. In one aspect, the display screen may use liquid crystal display (LCD) technology, light emitting polymer display (LPD) technology, or light emitting diode (LED) technology, although other display technologies may be used in other aspects. In some aspects, the display may be a touch-sensitive display screen that is configured to sense user input as input signals. In some aspects, the display may use any touch sensing technologies, including but not limited to capacitive, resistive, infrared, and surface acoustic wave technologies.

The volume control 12 is configured to adjust a volume level of sound output of the local device in response to receiving a user-adjustment (e.g., user input) at the control. In one aspect, the volume control may be a "master" volume control that is configured to control the overall volume level (e.g., sound output level of the speaker 22) of the local device. In one aspect, the volume control may be a "hardware" volume control that may be a dedicated volume input control, such as one or more buttons, a rotatable knob, or a physical slider. In some aspects, the volume control may be any type of physical input device that can adjust the overall volume level. In one aspect, the volume control may be a single volume control that includes several volume settings (or positions), where each setting defines a different volume level (e.g., a different sound output level (e.g., dB SPL)) of the local device. In particular, the volume control may (e.g., in response to a user-adjustment) incrementally increase or decrease the volume level based on a user adjusting the control's volume setting or position. For example, when the volume control is a rotatable volume knob, the control may have several (e.g., 18) volume settings, where each successive volume setting may correspond to a degree of rotation and may increase the overall volume by a particular gain value. In this case, each volume setting may correspond to a 20° rotation about a center axis. For instance, a first volume setting may be 0°, where the overall volume is muted, a second volume setting may be 20° (e.g., where the overall volume increases by a particular gain value), and so on. Thus, the knob produces a control signal that either incrementally increases or decreases the volume based on how much the knob is twisted and in what direction (e.g., turning clockwise increases the volume, whereas turning counter-clockwise decreases the volume). In one aspect, the volume control may be a master volume control that is configured to provide bi-directional control for either incrementally increasing or decreasing an overall volume level of (e.g., sound output of) the device. In one aspect, the control may be a part of the local device (e.g., integrated on the device). In another aspect, the volume control may be a part of an electronic device that is communicatively coupled with the local device.

In another aspect, the volume control may be a "software" volume control, such as user interface (UI) item that is displayed on (e.g., a graphical user interface (GUI) within) the display screen 25 of the local device. For example, the volume control may be a slider that may be translated (e.g., moved in at least one direction) along a predefined slidable range. When user input is received to adjust (or translate) the position of the slider (e.g., by the user touching the slider on the display screen and dragging it in one or more directions), the volume control adjusts the overall volume level based on the position of the slider. In one aspect, similar to the example of the physical control, the UI item may include several volume settings, where each position of the slider may correspond to a different volume level for the device. In this case, since the slider has a pre-defined slidable range, or a slidable distance from one side, each volume setting may correspond to a distance along the slidable range. In another aspect, the volume settings may correspond to a percentage (e.g., from 0 to 100 percent) that may correspond to the slider's distance from a starting position along the slidable range. In another aspect, the volume control may include several volume settings as numerical values (e.g., 1-10), where the volume settings may be changed by a user-adjustment to the volume control (e.g., selecting, dragging, twisting, etc.).

In some aspects, the volume control may be any input by a user of the device. For example, the input may include a gesture (e.g., a hand gesture, a finger gesture, a head gesture, etc.) made by the user and detected by the device (e.g., by the IMU 11 detecting motion of the local device that is caused by the hand gesture). In another aspect, the volume control may be a voice command that is received via the microphone 23. More about the volume control 12 is described herein.

The controller 20 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations. For instance, the controller 20 may be configured to engage in a call and simultaneously perform a joint media playback session to stream (e.g., exchange) media content with one or more remote devices, via the network interface 21. In another aspect, the controller may be configured to perform audio signal processing operations upon audio data of the media content and/or audio data (e.g., a downlink signal) associated with an engaged call. More about the operations performed by the controller 20 is described herein.

The memory 26 may be any type of (e.g., non-transitory machine-readable) storage medium, such as random-access memory, CD-ROMS, DVDs, Magnetic tape, optical data storage devices, flash memory devices, and phase change memory. In one aspect, the memory may be a part of (e.g., integrated within) the local device. In another aspect, the memory may be a part of the controller 20. In some aspects, the memory may be a separate device, such as a data storage device. In which case, the memory may be communicatively coupled (e.g., via the network interface 21) with the controller 20 in order for the controller to perform one or more of the operations described herein.

As shown, the memory has stored therein, an operating system (OS) 27, a media application 28, and a telephony application 29, which when executed by the controller cause the local device to perform one or more operations, as described herein. In one aspect, the memory may include more or less applications. The OS 27 is a software component that is responsible for management and coordination of activities and the sharing of resources (e.g., controller resources, memory, etc.) of the local device 2. In one aspect, the OS acts as a host for application programs (e.g., applications 28 and 29) that run on the device. In some aspects, the applications may run on top of the OS. In one aspect, the OS provides an interface to a hardware layer (not shown) of the local device, and may include one or more software drivers that communicate with the hardware layer. For example, the drivers can receive and process data packets received through the hardware layer from one or more other devices that are communicatively coupled to the device (e.g., user input devices, such as a display 25, which may be a touch-sensitive display screen, one or more of the sensors 10, etc.).

In one aspect, the media application 28 may be an application which when executed by the local device streams media content to the local device (e.g., from the media content server 5). Specifically, the media application may be a music streaming application, which when executed streams music for playback by the speaker 22 (and/or speaker 83 of the audio output device). As another example, the media application 28 may be a multi-media (e.g., video and/or audio) streaming application, which streams multi-media content (e.g., movies, etc.) for playback at the local device (e.g., for video playback through the display screen 25 and/or audio playback through the speaker 22). In another aspect, the application may retrieve the media content from local memory (e.g., memory 26) and/or from a remote source, such as the media content server 5, as described herein. In one aspect, to stream media content, the media application may display a graphical user interface (GUI) on the display screen 25, through which a user may navigate the application in order to select one or more pieces of media content for streaming to the local device (and/or audio output device).

In one aspect, the telephony application 29 may be an application which when executed by the local device allows the local device to initiate and conduct a telephone (telephony) call with one or more remote devices. For example, when initiated (e.g., when the user selects a UI item of the application displayed on the display screen 25), the application may display a GUI through which the local user may dial a telephone number. Once dialed, the local device may have connected to the remote device via a cellular network (e.g., a 4G Long Term Evolution (LTE) network) of the network 4, as described herein. In some aspects, the telephony application may be an audio-only (or voice-only) telephony application, which is capable of performing audio calls (e.g., where the local device and one or more remote devices exchange audio data captured by one or more microphones, which is used to drive one or more speakers of the respective devices). In another aspect, the telephony application may be a video call (or video conference) application, which allows the local device 2 to conduct a video call with one or more remote devices, as described herein. In another aspect, the local device may include a video call application, which is separate from the telephony application.

In another aspect, the local device 2 may include one or more other applications, which when executed causes the local device (and/or audio output device) to playback (or output) audio and/or video (or image) content. For example, the memory may include a XR presentation application, which when executed by the (e.g., controller 20 of the) local device 2, allows the local user of the device to participate within a XR environment.

The audio output device 6 includes a controller 80, a network interface 81, a speaker 83, a microphone 84, an accelerometer 85, and a volume control 82. In one aspect, the device may include more or less elements, such as having memory. In some aspects, the microphone may be an external or internal microphone, as described herein. In the case of an in-ear headphone, the internal microphone may sense inside the user's ear when the headphone is positioned on (or in) the user's ear. The accelerometer is arranged and configured to receive (detect or sense) speech vibrations that are produced while a user (e.g., who may be wearing the output device) is speaking, and produce an accelerometer signal that represents (or contains) the speech vibrations. Specifically, the accelerometer is configured to sense bone conduction vibrations that are transmitted from the vocal cords of the user to the user's ear (ear canal), while speaking and/or humming. For example, when the audio output device is a wireless headset, the accelerometer may be positioned anywhere on or within the headphone, which may touch a portion of the user's body in order to sense vibrations.

In one aspect, controller 80 is configured to perform audio signal processing operations and/or networking operations, as described herein. For instance, the controller may be configured to obtain (or receive) an audio data (as an analog or digital audio signal) of media content or user-desired media content (e.g., music, etc.) for playback through the speaker 83. In some aspects, the controller may obtain audio data from local memory, or the controller may obtain audio data from the network interface 81, which may obtain the data from an external source such as the local device 2 (via its network interface 21). For instance, the output device may stream an audio signal from the local device (e.g., via the BLUETOOTH connection) for playback through the speaker 83. The audio signal may be a signal input audio channel (e.g., mono). In another aspect, the controller may obtain two or more input audio channel (e.g., stereo) for output through two or more speakers. In one aspect, in the case in which the output device includes two or more speakers, the controller may perform additional audio signal processing operations. For instance, the controller may spatially render the input audio channels (e.g., by applying spatial filters, such as head related transfer functions (HRTFs)) to produce binaural output audio signals for driving at least two speakers (e.g., a left speaker and a right speaker).

In one aspect, the volume control 82 may perform similar operations as the control 12 of the local device. For instance, upon receiving user input, the control may adjust the (e.g., overall) volume of sound output by the (e.g., speaker 83 of the) audio output device 6. In some aspects, the volume control 82 may be used to adjust the volume at the local device 2. In which case, upon receiving user input, the audio output device 6 may transmit a control signal indicating a user-adjustment of the volume control 82 to the local device, which may use the signal to adjust the volume of one or more audio signals. More about adjusting the volume is described herein.

As described herein, the controller 20 may be configured to perform (e.g., additional) audio signal processing operations based on elements that are coupled to the controller.

For instance, when the local device includes two or more "extra-aural" speakers, which are arranged to output sound into the acoustic environment rather than speakers that are arranged to output sound into a user's ear (e.g., as speakers of an in-ear headphone), the controller may include a sound-output beamformer that is configured to produce speaker driver signals which when driving the two or more speakers produce spatially selective sound output. Thus, when used to drive the speakers, the local device may produce directional beam patterns that may be directed to locations within the environment.

In some aspects, the controller 20 may include a sound-pickup beamformer that can be configured to process the audio (or microphone) signals produced two or more external microphones of the output device to form directional beam patterns (as one or more audio signals) for spatially selective sound pickup in certain directions, so as to be more sensitive to one or more sound source locations. In some aspects, the controller may perform audio processing operations upon the audio signals that contain the directional beam patterns (e.g., perform spectrally shaping).

In another aspect, the controller 80 may perform one or more functions. For example, the controller 80 may be configured to perform an active noise cancellation (ANC) function to cause the speaker 83 to produce anti-noise in order to reduce ambient noise from the environment that is leaking into the user's ears. The ANC function may be implemented as one of a feedforward ANC, a feedback ANC, or a combination thereof. As a result, the controller may receive a reference microphone signal from a microphone that captures external ambient sound, such as microphone 84. In another aspect, the controller may perform any ANC method to produce the anti-noise. In another aspect, the controller 80 may perform a transparency function in which sound played back by the device is a reproduction of the ambient sound that is captured by the device's external microphone in a "transparent" manner, e.g., as if the headphone was not being worn by the user. The controller processes at least one microphone signal captured by at least one external microphone 84 and filters the signal through a transparency filter, which may reduce acoustic occlusion due the audio output device being on, in, or over the user's ear, while also preserving the spatial filtering effect of the wear's anatomical features (e.g., head, pinna, shoulder, etc.). The filter also helps preserve the timbre and spatial cues associated with the actual ambient sound. In one aspect, the filter of the transparency function may be user specific according to specific measurements of the user's head. For instance, the controller may determine the transparency filter according to a head-related transfer function (HRTF) or, equivalently, head-related impulse response (HRIR) that is based on the user's anthropometrics.

In one aspect, the (e.g., controller 20 of the) local device may perform (or control) at least some of the functions of the (e.g., controller 80 of the) audio output device 6. For instance, the controller 20 may perform the ANC function, whereby the anti-noise signal is produced from a reference microphone signal (e.g., from the audio output device and/or the local device). When produced, the local device may transmit the anti-noise signal to the audio output device for audio playback via the speaker 83.

As described herein, both the local device and audio output device are configured to establish a wireless audio connection (e.g., BLUETOOTH connection) in order to exchange audio data. Thus, audio data and/or control signals may be exchanged between both devices via the wireless connection.

In one aspect, operations performed by the controllers may be implemented in software (e.g., as instructions stored in memory and executed by either controller) and/or may be implemented by hardware logic structures as described herein.

In another aspect, at least some of the operations performed by the audio system 1 as described herein may be performed by the local device 2 and/or by the audio output device 6. For instance, the local device may include two or more speakers and may be configured to perform sound-output beamformer operations (e.g., when the local device includes two or more speakers). In another aspect, at least some of the operations may be performed by a remote server that is communicatively coupled with either device, for example over the network (e.g., Internet).

In one aspect, at least some elements of the local device 2 and/or the audio output device 6 may be integrated (or a part of) each the respective device. For example, when the audio output device is on-ear headphones, the microphone, speaker, and accelerometer may be a part of at least one earcup of the headphones that is placed on a user's ear. In another aspect, at least some of the elements may be separate electronic devices that are communicatively coupled to the device. For instance, the display screen 25 may be a separate device (e.g., being a display monitor or television) that is communicatively coupled (e.g., wired or wirelessly connected) with the local device to receive image data for display. As another example, the camera 24 may be a part of a separate electronic device (e.g., a webcam) that is coupled to the local device to provide captured image data.

Figure 3:
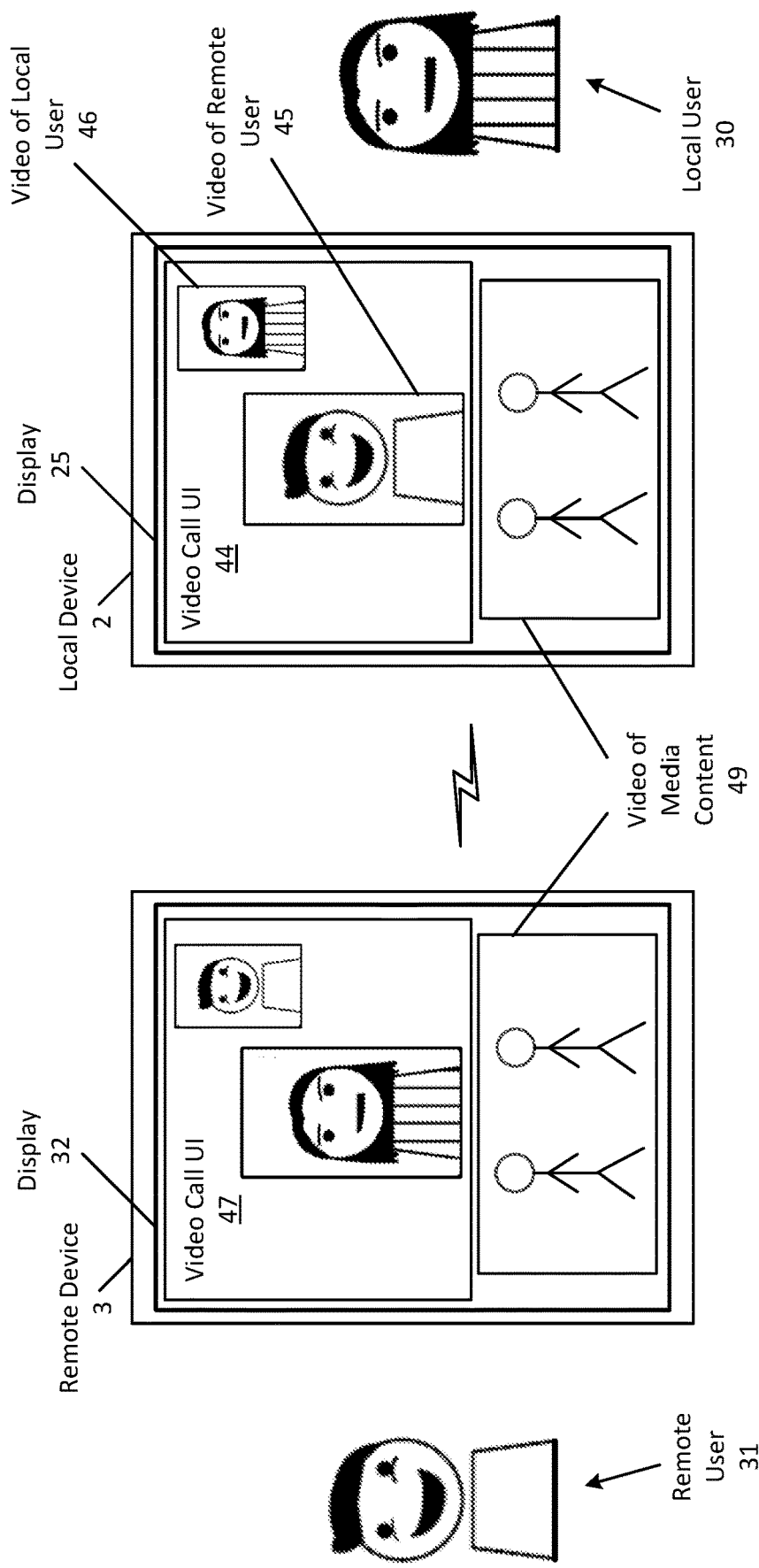
FIG. 3 shows an example of a local device and a remote device engaged in a video call while performing a joint playback media session to synchronously playback video and audio content according to one aspect.

As described herein, the local device 2 and remote devices 3 of the audio system 1 may perform a joint media playback session while engaged in a call in order to allow users of the devices to communicate while experiencing simultaneous media content playback. In one aspect, the local device may initiate the joint media playback session, while already engaged in a call. FIG. 3 illustrates graphical examples of the local device and remote device participating in joint media playback, while engaged in a video conference call.

FIG. 3 shows an example of the local device 2 and the remote device 3 engaged in a video call while performing a joint playback media session to synchronously playback video and audio content according to one aspect. Specifically, this figure shows a local user 30 and a remote user 31 (who may be at the same or different locations), who are engaged in a video call while simultaneously engaged in a joint media playback session. Displayed on the display 25 of the local device 2 is a video call user interface (UI) 44 (e.g., that is being displayed by a video call application (e.g., telephony application 29 shown in FIG. 2) that is being executed by the local device) that shows video (e.g., a video representation) of the local user 46 and video of remote user 45 (which is larger than the video of the local user) and positioned in the middle of the UI 44. Similarly, displayed on a display 32 of the remote device 3 is a video call UI 47, which is displayed by a video call application (which may be the same or different as the application executed on the local device), which shows the video of the remote and local users (with their positions transposed with respect to the positions shown on display 25 of the local device).

In one aspect, the video representations may be produced using video data captured by one or more cameras of each device. For example, while the local user 30 is in the field of view of camera 24, the camera may capture video data of the local user, which is then displayed on the local device and transmitted (e.g., via network 4) to the remote device for displaying on display 32.

Also shown on both devices is video of media content 49 of the joint media playback session of which both devices are engaged. In one aspect, both devices may stream the media content (e.g., using a video streaming application) to playback the media content (e.g., display the video on their displays and output audio content of the media content through one or more speakers) in sync, while both devices are engaged in the video call. As a result, both users may interact (e.g., have a conversation) with each other through the video call, while at the same time watch the video (and hear audio) of the media content 49.

In one aspect, the video call UI 44 (and/or the video call UI 47) may include additional video representations based on a number of remote users who are participating within the video call. In this example, the local device's UI 44 includes one video representation for the remote user 45, since the local device is only engaged in a video call with the one remote user. As more remote users join the video call, the UI 44 may include additional video representations, one for each remote user. As an example, when engaged in a video call with three remote devices, the video call UI 44 may include three video representations, one for each remote device (and the video representation of the local user 46). In one aspect, each of the video representations may be positioned about the UI 44. Continuing with the previous example, the three video representations may be positioned in row of three. In another aspect, the video representations may be positioned differently.

As described herein, the local device may engage in a joint media playback session while on a telephony (audio-only) call. In which case, both devices may display video of media content (and/or playback audio of the media content), while the users conduct a voice-only conversation. In one aspect, either of the devices may have initiated the telephony (or video) call, using any known method. For instance, the local user 30 may have initiated the telephony application, and dialed the remote device's telephone number.

As shown in this example, audio and video content may be played back in a joint media playback session while devices are engaged in a video call. In some aspects, any type of media content may be played back during a joint media playback session while local and remote devices are engaged in either a telephony (or voice-only) call or a video call. For example, the media content may include an XR presentation of which users of the local device and remote device(s) may participate. In particular, the media content may include video (or visual) content of the XR environment as image data that may be displayed on the display screen 25 of the local device and on display screens of the remote device(s) 3. In addition, the media content may include audio data (or one or more audio signals) of sounds within the XR environment. For instance, the audio data may include sounds of objects (e.g., a dog barking) within the XR environment.

As described herein, the users of the devices may participate within the XR environment. In particular, each of the devices may present different (or similar) perspectives of the XR environment. For instance, each device may present a first-person perspective of the environment (e.g., through a viewpoint of a virtual avatar associated with the device that is positioned within the XR environment). In which case, sounds (e.g., of objects) within the XR environment may be perceived differently by each of the participants. More about sounds of objects within XR environments is described herein.

As described herein, the local device may engage in a joint media playback session with a remote device, while both devices are engaged in a call, such as an audio-only call. In which case, the local device may receive a downlink audio signal from the remote device that includes speech of a remote user of the remote device, while the local device may transmit an uplink audio signal that includes speech of the local user. In addition, the local device may receive media content, such as an audio signal of a musical composition associated with the playback session. As a result, the local device may drive one or more speakers with a mix of the downlink audio signal and the audio signal, thereby allowing the local device to engage in a conversation with the remote user, while experiencing the media content.

While engaged in the joint media playback session, the local and remote devices may playback various types of media content, such as a musical composition, a movie, and an XR environment, as described herein. Audio data associated with each type of media content may be mastered differently. For instance, music may have a dynamic range of 96 dB, while audio of a movie may have a dynamic range of 144 dB. In addition, the media content may be mastered at different volume levels, where their signal levels may be higher (or greater) than a signal level of the downlink signal of the call. As result, when the signals of the media content and the downlink signal are mixed together, sound of the media content may be perceived louder by the local user than sound (e.g., speech) of the downlink signal and therefore may drown out the speech of the remote user contained within the downlink signal. In one aspect, to solve this problem, the local user may be provided with multiple volume controls, one for signal being output by the local device. This solution, however, has drawbacks. For example, to be effective, each audio signal that is being mixed and played back requires its own volume control. Thus, this solution may be unmanageable as the number of audio signals being played back increases. Therefore, there is a need for a single volume control (e.g., a master volume control for the local device) that adjusts the overall volume level of audio playback by applying different gains to the signals.

To overcome these deficiencies, the present disclosure describes an audio system that includes a single volume control that is capable of applying different volume control behavior to different audio signals. Specifically, in response to receiving a user-adjustment at a single (e.g., master) volume control of the local device to adjust the overall volume level, the local device applies a first gain adjustment to the downlink signal and a second gain adjustment to the audio signal, and drives the speaker 22 of the local device with a mix of the signals at the adjusted volume level. For example, returning to the previous example, since the volume level of the audio signal of the media content may be mastered higher (or louder) than the downlink signal, as the local user turns down the volume at the volume control, the second gain adjustment may reduce the signal level of the audio signal more (or at a faster rate) than the first gain adjustment reduces the signal level of the downlink signal. Thus, as the overall volume is turned down, the level of the audio signal decreases more than the level of the downlink signal.

Figure 4:
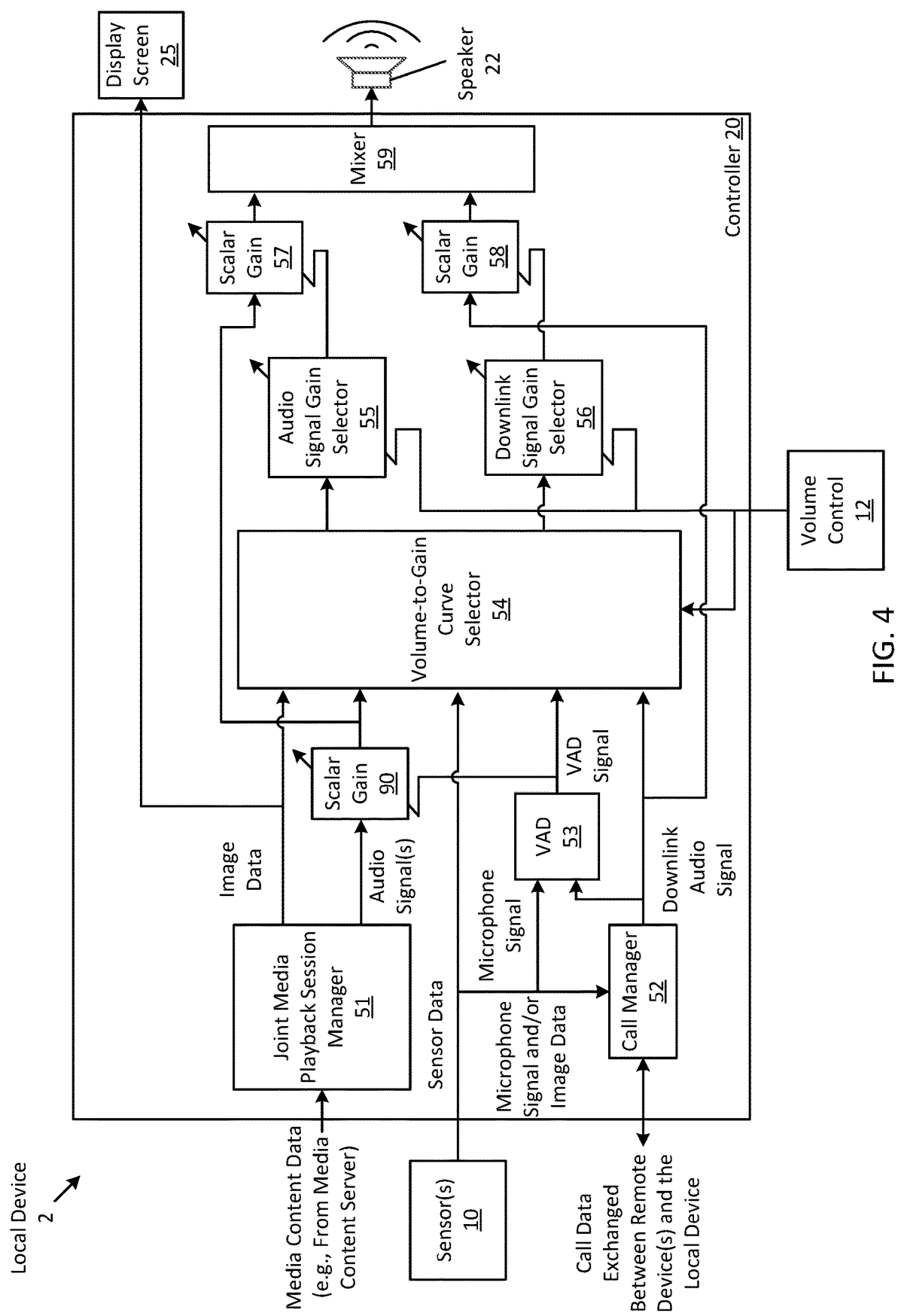
FIG. 4 is a block diagram of the local device that performs volume control operations according to one aspect.

FIG. 4 is a block diagram of the local device 2 that performs volume control operations according to one aspect. Specifically, this figure shows that the controller 20 has several operational blocks for performing audio signal processing operations for controlling the volume of audio output of the local device. As shown, the controller includes a call manager 52, a joint media playback session manager 51, a voice activity detector (VAD) 53, a volume-to-gain curve selector 54, an audio signal gain selector 55, a downlink signal gain selector 56, scalar gains 90, 57, and 58, and a (e.g., matrix) mixer 59. In one aspect, the controller may have more or less operational blocks. For example, the controller may include additional pairs of gain selectors and scalar gains, each pair for an additional audio signal that is to be mixed and played back during the call and playback session. In one aspect, at least some of the operational blocks may be optional, and therefore the operations of the optional blocks may be omitted or combined. For example, the scalar gain 90 may be optional, as described herein.

The call manager 52 is configured to initiate (and conduct) a call between the local device 2 and one or more of the remote devices 3. In one aspect, the call manager may initiate the call in response to user input. For example, the call manager may be a part of (or receive instructions from) a telephony application that is being executed by the (e.g., controller 20 of the) local device. For instance, the telephony application may display a UI on the display screen 25 of the local device, which may provide the local user the ability to initiate the call, such as a keypad, a contacts list, etc. Once the UI receives user input (e.g., the local user dialing a remote user's telephone number using the keypad), the call manager may communicate with the network interface 21 of the local device 2 to establish the call, as describe herein. In one aspect, the telephony call may be over any network, such as over the PSTN and/or over the Internet (e.g., for a VoIP call). In some aspects, the call manager may initiate the call, as described herein, and/or using any method.

Once initiated, the call manager may exchange call data between the remote device(s) with which the local device is engaged in the call. For example, the call manager may receive one or more downlink audio signals from each of the remote devices. In one aspect, the call manager may mix the downlink signals into (at least one) downlink audio signal (e.g., via matrix mixing operations). In some aspects, the call manager may receive audio and/or video (or image) data from the sensor(s) 10, and may transmit the data to each remote device with which the local device is engaged in the call. For example, the call manager may receive a microphone signal (which may include speech of the local user) from one or more microphones 23 and/or may receive image data captured by one or more cameras 24, and may transmit the microphone signal(s) and/or image data to each remote device. In some aspects, when the local device includes two or more microphones, the call manager may transmit a sound-pickup beamformer signal that includes sound of a directional beam pattern.

The joint media playback session manager 51 is configured to initiate the joint media playback session between the local device and one or more remote devices (e.g., with which the local device is engaged in the call and) in which the devices may independently stream media content for (e.g., synchronous) playback. For instance, in response to receiving instructions to initiate the session, the playback session manager may transmit a request to the media content server 5 to initiate the session, as described herein. In particular, a media application executing within the local device may transmit instructions to the session manager in response to receiving user input (e.g., based on a user selecting a play button in UI of the media application, which may be displayed on the display 25 of the local device 2). In another aspect, the session manager may request user authorization before initiating the session. For instance, once a user initiates media playback in a media application, the session manager may provide a notification (e.g., a pop-up notification displayed on the display screen 25) requesting for user authorization to initiate a joint media playback session with (at least some of) the participants of the call. When user-authorization is received (e.g., by receiving a user-selection of a UI item within the pop-up notification), the session manager may process the request to initiate the session, as described herein.

In one aspect, the joint media playback session manager 51 is configured to receive media content data (e.g., once the session has been initiated). In this case, the session manager is receiving at least one audio signal (or audio channel) associated with the media content. For example, the received audio signal may be associated with a musical composition of which the local user has required playback (e.g., via the UI of the media application). In one aspect, the session manager may receive two or more audio signals of a piece of media content. For instance, when streaming a musical composition from the media content server, the session manager may receive two or more audio channels (e.g., left and right channels of a stereophonic recording of the musical composition). In another aspect, the session may receive two or more channels, such as for example the entire audio soundtrack of a movie in 5.1-surround format.

In another aspect, the media content data may include audio data of at least some of the audio channels of sound (or audios) objects within a sound space, such as a sound space of an XR environment of the media content. The audio data of a sound object may include 1) an audio signal that includes sound of a (e.g., virtual) object within a XR environment and 2) spatial data that spatially represents a sound source of the sound object. In one aspect, the sound objects may correspond to objects within an XR environment. For instance, a sound object may include sound of a virtual dog (e.g., a sound of barking) and the location of the sound within a XR environment that is to be displayed on the display screen 25. In one aspect, the spatial data may be an angular/parametric representation of the sound source within the XR environment (e.g., with respect to the local device). In some aspects, the spatial data may indicate a three-dimensional (3D) position of the sound source with respect to the device (e.g., located on a virtual sphere surrounding the device) as position data (e.g., elevation, azimuth, distance, etc.). In one aspect, any method may be performed to produce the angular/parametric representation of the sound source, such as a Higher Order Ambisonics (HOA) representation of the sound source by encoding the sound source into HOA B-Format by panning and/or upmixing the at least one of ambient signals. In another aspect, the sound objects may be in any audio format (e.g., that includes the object's audio signal and spatial information).

The VAD 53 is configured to receive a microphone signal from microphone 23 of the sensors 10 and/or the one or more downlink audio signals from each of the remote devices with which the local device is engaged in the call, and is configured to perform voice activity detection (or speech detection) operations to detect a presence (or absence) of a user's voice (speech) contained therein. Specifically, the controller determines whether either of the signals include speech based on output from the VAD. For instance, the VAD may determine whether (at least a portion of) spectral content of a signal is associated with human speech. In another aspect, the VAD may determine a presence of speech based on whether a signal level of (e.g., the portion of spectral content of) the signal exceeds a threshold. In some aspects, the VAD may use any method to determine whether there is a presence of speech contained within the signal. The VAD is configured to generate an output based on the received signals. In particular, the VAD may generate a VAD signal which indicates whether or not speech is contained within a microphone signal of the local device, and/or may generate a VAD signal which indicates whether or not speech is contained within a downlink audio signal. For example, a VAD signal may have a high signal level (e.g., "1") when the presence of speech is detected, and may have a low signal level (e.g., "0") when speech is not detected (or at least not detected within a threshold level). In another aspect, the VAD signal need not be a binary decision (speech/not-speech); it could instead be a speech presence probability. In some aspects, the VAD signal may also indicate the signal level (e.g., sound pressure level (SPL)) of the detected speech.

As illustrated, the VAD 53 may generate one VAD signal that indicates whether speech is contained within either one or more microphone signals and/or one or more downlink audio signals. In one aspect, the VAD may have multiple outputs. Specifically, the VAD may generate one VAD signal that indicates the presence (or absence) of speech contained within the microphone signal and generate another VAD signal for the downlink audio signal.

In some aspects, the VAD may perform additional audio signal processing operations. For example, the VAD may perform speech digital signal processing (DSP) operations upon the downlink audio signal and/or microphone signal in order to reduce (or eliminate noise) contained therein (e.g., in order to produce a speech signal that mostly contains speech). In one aspect, to process a signal, the VAD may apply a high-pass filter due to most noise (or non-speech noise) having low-frequency content. In another aspect, the VAD may improve signal-to-noise ratio (SNR) of a signal by spectrally shaping the signal by applying one or more filters (e.g., a low-pass filter, a band-pass filter, a high-pass filter, etc.). In some aspects, the VAD may perform any operation to reduce noise within a signal.

The scalar gain 90 is configured to receive the one or more audio signal of the media content from the session manager 51, and is configured to process the audio signal based on the VAD signal received from the VAD 53. Specifically, the scalar gain is configured to adjust (e.g., at least a portion of) the signal level of the audio signal by applying one or more scalar gain values (e.g., as gain adjustments) upon the audio signal to produce a gain-adjusted audio signal based on whether the VAD signal indicates that there is a presence of speech detected within the downlink audio signal (and/or the microphone signal). In particular, the gain adjustment may reduce a signal level of the audio signal of the media content associated (e.g., being streamed by) the joint media playback session. Thus, the scalar gain may apply a gain adjustment to the audio signal to reduce a signal level of the audio signal in response to (e.g., the controller 20) determining that the downlink signal includes speech. In one aspect, the applied scalar gain may be a predefined value. In some aspects, the application of this scalar gain may be performed prior to other audio signal processing operations, such as the application of other scalar gain 57, as described herein.

In another aspect, the applied gain may be based on the VAD signal. For example, as described herein, the VAD signal may indicate a signal level of the downlink audio signal (or more specifically, a signal level of the speech contained therein). In which case, the scalar gain may be configured to adjust the applied scalar gain value based on the signal. For example, when the speech detected in the downlink audio signal is at a determined signal level, the scalar gain may apply the gain value to reduce the signal level of the audio signal to below that of the determined signal level of the downlink signal in order to ensure that the sound of the media content is lower than the speech within the call.

The volume-to-gain curve selector 54 is configured to perform a contextual analysis of call and/or media content data to determine a prioritization of audio signals of the call and/or media playback session that indicates which audio signals are to be emphasized over other audio signals when played back by the (e.g., local device of the) audio system 1. Specifically, the curve selector determines whether the local user intends (or wishes) to emphasize or hear one or more sounds of the call and/or media content over other sounds during the call and playback session, and in response prioritizes those sounds that are to be emphasized over others. For instance, the curve selector determines whether to prioritize sounds of the call (e.g., the downlink audio signal) and/or one or more sounds of (e.g., one or more audio signal(s) of) the media content that is being played back during the media playback session based on one or more criteria. As described herein, upon determining which audio signals are to be prioritized over other audio signals (and therefore emphasized), the controller may apply different scalar gains (e.g., and/or vector gains) in response to receiving a user-adjustment at the volume control 12 (and/or the volume control 82 of the audio output device). As a result, when these gain-adjusted signals are used to drive the speaker 22, sounds of prioritized audio signals may have a higher volume level (e.g., a greater output sound level) than volume levels of audio signals that are less prioritized. More about applying scalar gains is described herein.

In one aspect, a determination of audio signal priority may be based on whether the local user is speaking (e.g., to one or more remote users of the remote devices with which the local device is engaged in the call). Specifically, the curve selector determines whether the microphone signal produced by microphone 23 includes speech of the local user based on output from the VAD 53. For instance, the curve selector receives the VAD signal produced by the VAD 53 and determines whether the VAD signal indicates that the microphone signal includes speech (e.g., whether the signal has a high signal level). In response to determining that the output of the VAD indicates a detection of speech, the curve selector may prioritize the downlink audio signal over the audio signals of the media content.

In one aspect, prioritization based on whether speech of the local user is detected for a period of time. In particular, the curve selector may prioritize the downlink audio signal of the call once the local user has spoken for the period of time. As an example, while engaged in the call, the devices may playback media such as a movie during the playback session. Occasionally, the local user may speak to one or more remote users. In which case, when the local user (and a remote user) are engaged in a (e.g., long) conversation, the VAD signal may detect speech for the period of time. In response, the curve selector may prioritize the downlink signal, since the local user may wish to hear the remote user over the media content. In other cases, however, the local user may wish to just make a comment or a short statement, without engaging in a conversation. In which case, the VAD signal may detect speech for less than the period of time. As a result, the curve selector may not prioritize the downlink audio signal. In one aspect, instead of prioritizing the downlink audio signal, the curve selector may prioritize the media content over the downlink signal, since the local user does not intend to talk at length to a remote user. In another aspect, the curve selector may not prioritize either of the signals. As described herein, when both signals are not prioritized (or may be prioritized the same), the controller may apply similar scalar gains upon the volume control receiving a user-adjustment. More about applying scalar gains is described herein.

In another aspect, the curve selector may prioritize signals based on sensor data received from one or more of the sensors 10. For instance, the selector may prioritize the downlink audio signal(s) based on speech of the local (and/or remote) users. Specifically, the curve selector may perform speech recognition (e.g., through the use of a speech recognition algorithm) to analyze an audio signal (e.g., a microphone signal and/or the downlink audio signal) to find (or recognize) speech therein. In particular, the controller may analyze audio data of the signals according to the algorithm to identify a word or phrase contained therein. The curve selector may determine the prioritization based on the identified word or phrase. For instance, the selector may use the identified word or phrase to perform a table lookup into a data structure that associates prioritization values for the downlink signal with one or more words or phrases. Upon determining that the prioritization value is above a threshold, the curve selector may prioritize the downlink signal.

In another aspect, the curve selector may prioritize the downlink audio signal(s) based on audio data contained therein. For example, similar to the prioritization based on the VAD signal of the microphone signal described above, the curve selector may prioritize the downlink signals based on whether a VAD signal detects speech (e.g., for the period of time) within the downlink audio signal. In one aspect, the curve selector may prioritize two or more downlink audio signals from two or more remote devices differently. For instance, upon detecting speech of one downlink signal, the curve selector may prioritize that downlink signal over other downlink signals and/or the audio signal of the media content. Thus, when one remote user is speaking, the speech from that user may be prioritized over the other remote users, who at the time may or may not be speaking.

In some aspects, the curve selector may prioritize one or more downlink signals and/or one or more audio signals of the media content based on gestures performed by the local user. The curve selector may receive the sensor data that indicates whether the user is performing a gesture that is associated with the local user wishing to emphasize sound of one or more signals over others that are being played back. Specifically, the curve selector may use the sensor data to determine whether the user is gesturing towards an object that is displayed on the display screen 25 of the local device in order to emphasize sound associated with that object. As described herein, the local device may display a video representation of a remote user on the display screen of the local device. The curve selector may determine whether the local device wishes to emphasize sound of one or more remote users. For example, the curve selector may determine whether the user intends to emphasize sound of a remote user by determining whether the local user is looking at (or focusing on) the remote user's video representation. In particular, the curve selector may receive image data captured by camera 24, where the camera's field of view includes at least a portion of the local user (e.g., the local user's face). Using the image data, the curve selector may determine whether a gaze of at least one eye of the user is focused on the video representation of the remote user. If so, the curve selector may prioritize the downlink audio signal associated with that remote user's device.

In another aspect, the curve selector may determine whether the user intends to emphasize sound of a remote user based on motion data (e.g., produced by the IMU 11). Specifically, the curve selector may determine, based on the motion data, whether the local user is moving at least a portion of the local device that indicates that the local user is gesturing towards the video representation of the remote user. For example, when the local device is an electronic device in which the display screen is integrated, the curve selector may determine whether the local user is tilting the display screen in a direction towards the video representation. For example, the selector determines whether the screen is tiling about a center axis that runs through the display screen in a direction towards the video representation displayed on the display screen with respect to the center axis. For example, referring to FIG. 3, the display screen 25 of the local device 2 is facing the local user 30, while conducting the call. The curve selector may determine that the local user wishes to prioritize speech of the remote user 31 in response to detecting motion data that indicates that the display screen 25 (or the local device 2) is tilting away from the local user about a lateral axis (e.g., an X-axis) that runs laterally through a center point of the display screen. In another aspect, the gesture may be a user-selection of the video representation. For instance, the user may perform a touch-selection on the display screen (which may be touch-sensitive) at a location that the video representation is displayed.

In some aspects, the curve selector may determine whether the user intends to emphasize one or more sounds associated with the media content based on the sensor data. As described herein, the media content may include several audio signals, each associated with a sound source. For example, when the media content is a XR environment, the local device may display visual content of the XR environment on the display screen 25, and may drive the speaker 22 with one or more audio signals that include sounds of the XR environment. Specifically, the audio signals may each be associated with one or more objects that are displayed within the XR environment. In some aspects, the controller may spatial render (e.g., by applying HRTFs) these audio signals to provide the user with a 3D sound experience in which the sound sources are perceived at different locations within a sound space. In one aspect, the curve selector may determine whether the user wishes to emphasize a sound within the XR environment based on a user gesture towards a displayed object that is associated with the sound. In particular, the curve selector may perform this determination in a similar fashion as described with respect to the remote users. For example, the curve selector may determine that a gaze of the user is focused on the object and/or determine, based on motion data, that the user is tilting the displays screen in a direction towards the object. Based on this determination, the curve selector may prioritize this sound, over one or more other sounds within the XR environment. Although the prioritization is based on objects within an XR environment, this determination may be performed upon any type of media content that includes image data and one or more audio signals, such as a movie or a video game.

In yet another aspect, the curve selector may determine which signals to prioritize based on particular operational functions that are being performed by the controller. As described herein, the controller may perform an ANC function to cause the speaker 22 (and/or speaker 83) to produce anti-noise. In addition to (or in lieu of) this function, the controller may perform a transparency function in which ambient sound is played back by the device. In one aspect, the prioritization of sounds may be determined based on which function is being performed by the controller. For example, if performing the ANC function in order to block out ambient sounds, the controller may prioritize sounds of the media content. In contrast, if the controller is performing the transparency function, the controller may prioritize the downlink audio signal since the local user may have activated the transparency function in order to hear the user's own voice while talking.

As described thus far, the curve selector may prioritize sounds associated with the playback session and/or call based on one or more criteria. In another aspect, the curve selector may prioritize other sounds (or groups of sounds) that are being played back by the local device. For example, the curve selector may prioritize sounds produced by one or more software applications that are being executed by the (e.g., controller 20 of the) local device based on one or more criteria. The software applications may include a telephony application that is performing the call between the local device and the one or more remote devices, one or more media applications that are executing the media playback session, and/or other applications that may executing within the local device (e.g., a messaging application, an alarm application, etc.). In one aspect, the prioritization of audio signals associated with applications (e.g., that include sounds of the applications) may be based on an order at which the local device begins to execute the applications. For example, referring to FIG. 3, the curve selector may prioritize the video call application over the media application that is playing back the media content, since the local and remote devise are engaged in the video call before the local device initiates the media application and engages in the playback session. In one aspect, applications that are subsequently executed may be given a lower priority to applications that are already being executed by the local device.

In one aspect, the curve selector may prioritize several sounds over a sliding scale based on the criteria mentioned herein. For example, the curve selector may prioritize some sounds as "high-priority", some sounds as "medium-priority", and other sounds as "low-priority". In some aspects, the selector may numerically prioritize audio signals, where a high-priority audio signal has a high value (e.g., "10"), while lower priority audio signals have a lesser value (e.g., "1"). In other aspects, some audio signals may have the same priority. For instance, when engaged in a call with multiple (e.g., three or more) remote users, the curve selector may prioritize downlink audio signals of two remote devices the same (e.g., high) in response to determining that speech is detected in both signals.

In one aspect, the curve selector 54 is configured to determine (or select) a volume-to-gain curve for at least one audio signal that is being (e.g., mixed and) played back by the local device during the call and/or playback session. Specifically, once the selector prioritizes the audio signals (e.g., determining which sounds the local user wants emphasized over other sounds), the selector may determine a curve for each audio signal, which indicates an amount of gain (or attenuation) to be applied to the signal based on a user-adjustment of the volume control.

Figure 5:
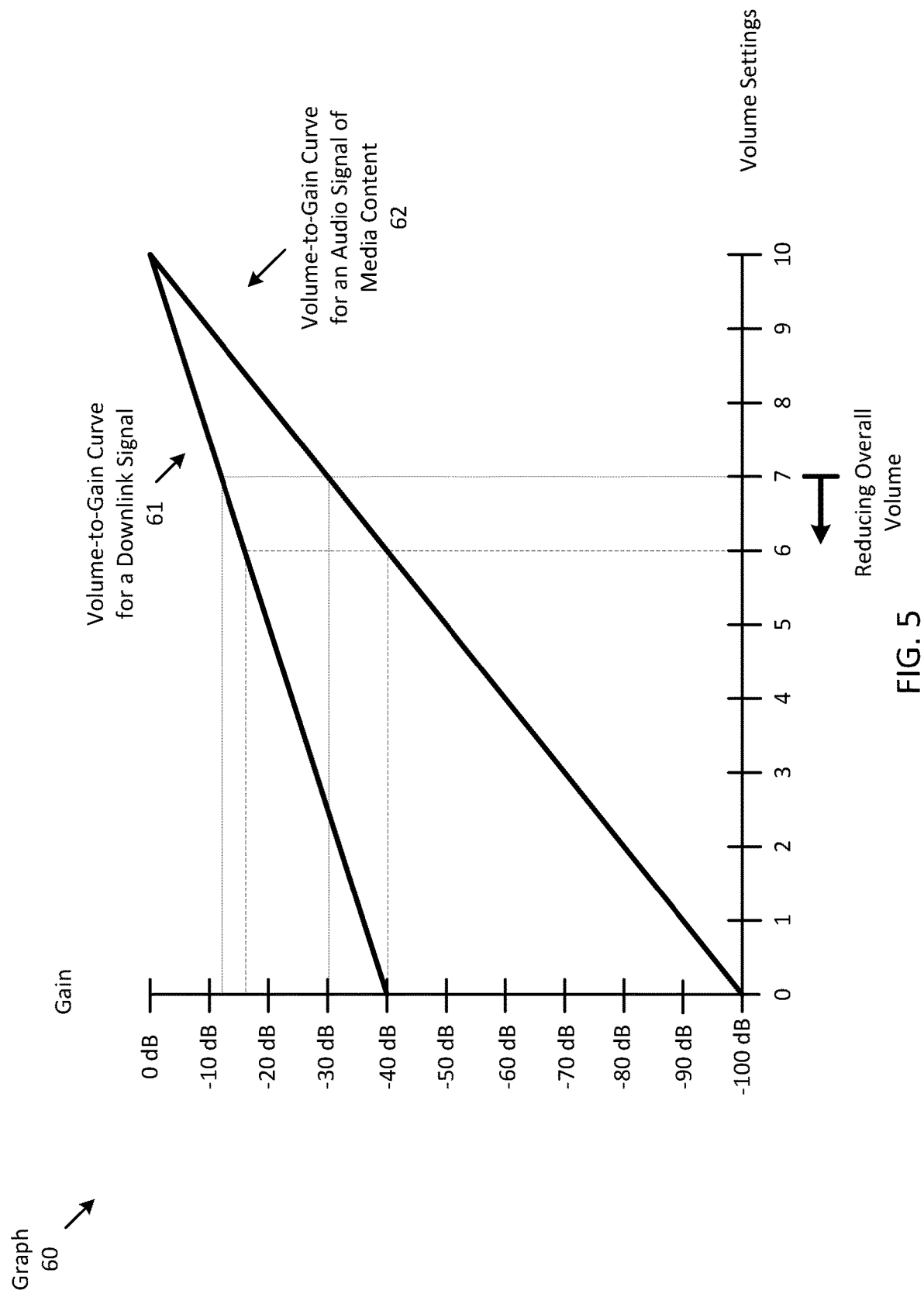
FIG. 5 shows examples of volume-to-gain curves according to one aspect.

In one aspect, a volume-to-gain curve may associate each of several volume settings of the volume control to a (e.g., different) scalar gain value that may be applied to its respective audio signal (e.g., in response to the volume control receiving a user-adjustment). In other words, the curve is a function of gain with respect to volume settings. For example, the volume-to-gain curve may associate scalar gain values with volume settings of the volume control that indicate a position and/or orientation of the volume control, as described herein. In another aspect, the volume-to-gain curve may associate one or more vector gains with the volume settings, which may allow the control to select one or more frequency bands at which one or more selected gains are to be applied to an audio signal. In one aspect, the volume settings may be numerical values (e.g., 1-10), where each value is associated with an adjustment of the volume control, and each numerical value may be associated with a scalar gain value. In another aspect, the volume-to-gain curve may indicate a signal level (e.g., in dB) of an audio signal at a particular volume setting. Specifically, the curve may indicate a desired signal level (or gain) of the audio signal at each volume setting. This is illustrated in FIG. 5. From the desired signal level, the controller may determine a gain adjustment to be applied to each particular audio signal.

In one aspect, the curve selector may select a curve for an audio signal based on the signal's priority. Specifically, a curve selected for a high-priority audio signal may have a rate of change that is lower than a curve selected for another audio signal of lower priority. For example, upon determining that the local user is speaking (e.g., based on the VAD signal), the curve selector may prioritize the downlink audio signal and select a first curve for the downlink signal and a second curve for the audio signal of the media content, where the first curve has a lower rate of change than the second curve. As described herein, upon receiving a user-adjustment of the volume control, such as turning down the overall volume level (thereby reducing the current volume setting by one, for example), the controller may use the first curve to determine a first gain adjustment based on a (first) gain of the first curve that is associated with the reduced volume setting, and may use the second curve to determine a second gain adjustment based on a (second) gain of the second curve that is associated with the reduced volume setting, where the first gain is lower than the second gain. Once determined, the controller may reduce (or attenuate) a signal level of the downlink signal according to the first gain from the first curve, and may reduce a signal level of the audio signal according to the second gain from the second curve. As a result, the signal level of the audio signal may be reduced more than the signal level of the downlink audio signal, which when both mixed and played back by the local device results in the sound of the downlink audio signal having a higher volume level than a volume level of the audio signal. This change in volume allows the downlink signal to be emphasized more over the audio signal (since the downlink signal will have a higher sound output level), thereby allowing the local user to engage in a conversation with the remote user without being distracted by the sound of the media content. More about applying scalar gain values is described herein.

As described herein, the volume-to-gain curves may be functions of gains (e.g., scalar gain values) with respect to volume settings of the volume control 12. In one aspect, a volume-to-gain curve may be a linear function of gain with respect to volume settings, where different curves may have different slopes based on their associated audio signal's priority, as described herein. An example of a linear volume-to-gain curve is illustrated and described in FIG. 5, where a curve 61 for a downlink signal has a lesser slope than a curve 62 for an audio signal of the media content. More about these curves is described herein. In another aspect, the curve may be a non-linear function. In another aspect, the curves may be any type of function of gain with respect to volume settings.

In one aspect, the curves may be stored in memory (e.g., of the controller 20) of the local device. Specifically, the curves may be stored in data structures (e.g., lookup tables), where each curve is stored in a particular lookup table. In some aspects, the curves may be predefined curves that are determined in a controlled environment (e.g., in a laboratory). In another aspect, at least some curves may be learned through machine learning operations or through user input. For example, the curves may be user-defined (e.g., by the local user of the local device). In some aspects, the curves may be stored in memo As described thus far, the curve selector 54 may select a volume-to-gain curve for at least some audio signals based on the signal's determined priority. In one aspect, the selector may select multiple (two or more) curves for at least one audio signal. As in the previous example, the curve selector may select a first curve with a lower rate of change for the downlink audio signal and select a second curve with a higher rate of change for the audio signal, when the downlink signal has a higher priority. In one aspect, these selections may correspond to a received user-adjustment from the volume control to reduce the overall volume level of the local device, since as the user turns down the volume, the output sound level of the downlink signal will be greater than the output sound level of the audio signal in order to emphasize the downlink signal. In some aspects, the curve selector may select different curves for audio signals that correspond to a user-adjustment of the volume control to increase the overall volume level. For example, the curve selector may select a third curve for the downlink signal and a fourth curve for the audio signal, where the third curve has a higher rate of change than the fourth curve. This will result in the output sound level of the downlink signal increasing more than the level of the audio signal, as the volume level of the local device is turned up.

In another aspect, rather than selecting different curves, the selected curves may be used interchangeably between the signals. For example, the controller may use the first curve to determine the first gain for the downlink audio signal and use the second curve to determine the second gain for the audio signal, in response to the user-adjustment of the volume control reducing the overall volume level, as described herein. Alternatively, the controller may use the second curve to determine a gain for the downlink audio signal and the first curve to determine a gain for the audio signal, in response to the user-adjustment of the volume control increasing the overall volume level. More about using the curves to determine gains is described herein.

In some aspects, the selection of curves may be based on one or more audio signal processing operations that have been (or going to be) performed upon one or more of the signals. For example, the curve selector 54 may adjust the selection of the volume-to-gain curve of the audio signal based on whether a scalar gain value has been applied to the audios signal in order to reduce the signal's level in response to the VAD 53 detecting speech (e.g., within the downlink audio signal and/or the microphone signal), as described herein. Specifically, the selected curve for the audio signal may have a lower rate of change than a selected curve for the audio signal when the scalar gain 90 does not apply a gain value (e.g., in response to the VAD signal having a low signal level). More about the curve selector selecting different curves based on audio processing operations is described herein.

In one aspect, rather than (or in addition to) selecting volume-to-gain curves, the selector may determine different rates of change for gain values for audio signals based on prioritization. In particular, the selector may select a low rate of change for an audio signal with a high priority, and may select one or more high rates of change for audio signals of lower priority. For example, normally, the controller may adjust signal levels in a similar fashion when the volume level is increased or decreased (e.g., applying a gain when the volume is increased, such as 6 dB, and applying a similar reduction in gain or attenuation when the volume is decreased, such as −6 dB). When selecting different rates of change, however, the attenuation may change according to the rate. For example, if the high rate of change is twice that as the normal rate of change, signal levels of audio signals of lower priority may be attenuated by twice that of the particular attenuation (e.g., −12 dB).

In some aspects, these selections may correspond to user-adjustments of the volume control that reduce the overall volume. As described herein, the selector may select different (e.g., inverse proportional) rates of change for audio signals for user-adjustments that increase the overall volume. As described herein, these rates of change may be used by the gain selectors for using these rates of change for determining new gains based on volume control user-adjustments.

The audio signal gain selector 55 is configured to receive one or more volume-to-gain curves that were selected for one or more audio signals of the media content from the curve selector 54, and the downlink signal gain selector 56 is configured to receive one or more volume-to-gain curves that were selected for one or more downlink audio signals of the call from the curve selector. In one aspect, each of the gain selectors is configured to use their respective received gain curves to determine one or more scalar gain values based on user-adjustments of the volume control 12.

In one aspect, each of the gain selectors is configured to receive a control signal generated by the volume control 12, which may be in response to the control receiving a user-adjustment. Specifically, the control signal may indicate a (current or) adjusted volume setting of the volume control. For instance, when the volume control is a (e.g., UI) slider at a starting (or muted) position, and the user-adjustment moves the slider to a half-way point along a slidable range, the control signal may indicate the volume setting at 50%. In another aspect, the volume setting may be a numerical value associated with the user-adjustment, as described herein. For instance, when the control signal is a rotatable knob that is currently at an orientation of 300°, the volume setting may be at 15 of 18 settings, which may correspond to an overall volume level of approximately 80%. Upon receiving a user adjustment that rotates the knob down to 280°, the control signal may indicate that the volume setting has went down by one, to 14.

In one aspect, each of the gain selectors may select a gain-adjustment (e.g., which may be a gain to increase at least a portion of a signal level or an attenuation to reduce at least a portion of the signal level) as scalar gain values from their respective received volume-to-gain curves that are associated with the (adjusted) volume setting of the volume control. For example, when the curve is a linear function of gain with respect to volume settings, the gain selectors may select the gain along the curve that maps to the received volume setting. In another aspect, the gain selectors may select a difference in gain between the original volume setting and the new volume setting. For example, when reducing the overall volume level, the volume setting may be reduced by one, where the previous volume setting and the reduced volume setting both correspond to a different scalar gain value. As a result, when selecting the scalar gain value, the gain selectors may select the difference between the gain value associated with the previous volume setting and the gain value associated with the new (or reduced) volume setting. In some aspects, the gain selectors may indicate whether the selected scalar gain value is to be applied to increase the gain of a signal level or to be applied as an attenuation to reduce the signal level.

In another aspect, the gain selectors may select the gain-adjustment based on a gain of the volume-to-gain curve that is associated with the volume setting. In another aspect, the selection of the scalar gain may be based on a desired signal level of the curve that is associated with the volume setting. As described herein, the volume-to-gain curve may indicate desired signal levels. In which case, upon determining a desired signal level (e.g., −30 dBFS) that is associated with the volume setting, the gain selectors may select a scalar gain that increases (or decreases) the signal level of the audio signal to that desired level. In this case, when the desired signal level is −30 dBFS and the audio signal is at −20 dBFS, the gain selector may apply −10 dB to reduce the signal level.

In another aspect, the gain selectors may determine the scalar gain value based on the user-adjustment of the volume control in other ways. For example, as described herein, rather than (or in addition to) the curve selector determining curves, the selector may determine a rate of change for gain of one or more signals. In one aspect, the gain selectors may utilize the rate-of-change to determine a new gain value based on the adjusted volume control. For instance, when the volume control is adjusted to reduce the overall volume by reducing the volume setting by one, the gain selector may use the rate-of-change to adjust a current gain according to the changed volume setting. In another aspect, when the curve is in a lookup table, the gain selector may perform a table lookup into a data structure that stores the lookup table using the adjusted volume setting. Specifically, the gain selector 55 may perform a table lookup into a data structure that associates, for different user adjustments (e.g., volume settings), one or more gains for the audio signal of the streamed media content to select a gain associated with the (current) volume setting, and the gain selector 56 may perform a (e.g., similar) table lookup into the data structure to select another gain for the downlink audio signal, where both gains may be different (or the same). In some aspects, the gain selector may determine the appropriate scalar gain value for the signals of the call and/or playback session using any method.

The scalar gain 57 and 58 receive the audio signal of the media content and the downlink audio signal associated with the call, respectively, and are configured to process their respective signals based on the selected scalar gain values. Specifically, each of the scalar gains is configured to apply a gain-adjustment to their respective signals to produce an adjusted signal, which may have a higher and/or lower signal level based on the adjustment. For example, the scalar gain 57 may apply a gain-adjustment according to a selected scalar gain value by the gain selector 55 to attenuate a signal level of the audio signal, and the scalar gain 58 may apply a gain-adjustment according to a selected scalar gain value by the gain selector 56 to attenuate a signal level of the downlink signal, differently than the gain-adjustment by the scalar gain 57 (e.g., in response to the user turning down the volume at the volume control). In some aspects, each of the scalar gains 90, 57, and/or 58 may perform similar operations to reduce or increase signal levels of associated signals.

The mixer 59 is configured to receive the processed (e.g., gain-adjusted) signals from the scalar gains 55 and 58, and is configured to perform matrix mixing operations, for example, in order to produce a mix of the two signals. The controller may use the mixed signal to drive the speaker 22 to playback sound of the call, as well as the media content of the playback session, where sound of the signals have output audio levels that are at or below a current overall volume level of the local device. In another aspect, the mixer may receive one or more unprocessed signals (e.g., signals that are not gain-adjusted). For example, the mixer may receive the downlink audio signal from the call manager 52, rather than receiving the processed downlink audio signal from the scalar gain 58.

In one aspect, the controller may optionally perform additional DSP operations. For example, the controller may perform spatially rendering operations upon one or more of the signals (and/or the mix), by applying spatial filters, such as head-related transfer functions (HRTFs to produce binaural audio signals for driving one or more speakers (e.g., a left speaker and a right speaker), as described herein. As another example, when the local device (and/or audio output device) includes one or more loudspeakers, the controller may render a HOA representation of the audio signal(s) and downlink signal to produce one or more loudspeaker driver signals (e.g., based on a predefined loudspeaker configuration). The controller 20 may then use the processed mix to drive the speaker 22, as described herein.

As shown herein, the controller includes an audio signal gain selector 55 and scalar gain 57 to process an audio signal of the media content, and a downlink signal gain selector 56 and scalar gain 58 to process the downlink audio signal. In one aspect, the controller may include more or less gain selectors and/or scalar gains. For example, when the media content includes two or more audio signals, the controller may process each of those signals with a respective gain selector and scalar gain in order to adjust signal levels of each of the signals based on user-adjustments of the volume control, as described herein.

As described thus far, the controller may prioritize signals of the call and/or playback session in order to determine gain-adjustments based on user-adjustments of the volume control. In one aspect, the volume-to-gain curve selector may not prioritize one or more of the signals. In which case, the controller may apply the same (or similar) gain-adjustments to signals that are not prioritized. In another aspect, signals that are prioritized the same, may be gain-adjusted similarly as well.

In one aspect, the order of operations described herein may differ. For instance, the volume-to-gain curve selector 54 may be configured to determine curves (e.g., prioritizing signals and based on the prioritization determining curves), in response to the volume control receiving a user-adjustment. In which case, FIG. 5 shows examples of volume-to-gain curves according to one aspect. Specifically, this figure shows a volume-to-gain curve 61 for a downlink signal and a volume-to-gain curve 62 for an audio signal of media content. As shown, each of the curves is a linear function of gain (or gain-adjustment) with respect to volume settings, where each curve is a desired signal level for each respective signal. As shown, the curves are graphed in a graph 60, where the Y-axis represents gains (or gain adjustments) with respect to the dynamic range of the audio system 1 in the digital domain (e.g., decibels relative to full scale (dBFS)). Thus, the top of the Y-axis represents a maximum signal level, where each −10 dB step below 0 dB represents the gain (or attenuation) that is to be applied to the signal to attenuate the signal below a maximum level. In one aspect, the dynamic range of the audio system may change based on the bit depth of the digital audio data. The X-axis of the graph includes volume settings of the volume control, where the zeroth setting represents the lowest overall volume output level of the local device (e.g., mute), and the tenth setting represents the highest overall volume output level.

As shown, both of the curves 61 and 62 have different slopes. For instance, the audio signal curve 62 has a slope of 1 that originates from −100 dB at the zeroth volume setting and goes to 0 dB (maximum allowable signal level) at the tenth volume setting. Conversely, the curve 61 for the downlink signal has a lower slope of ⅖, where it starts at −40 dB at the zeroth volume setting and extends to 0 dB at the tenth setting. In one aspect, the differences in slopes may correspond to the determined priority of the signals, as described herein. For example, the downlink curve 61 may have a lower slope than the audio signal curve 62, due to having a higher priority than the audio signal. As a result, when the overall volume level is reduced, the signal level of the downlink signal is reduced less than the signal level of the audio signal.

The graph 60 also illustrates the change in gain in response to a reduction of the volume setting by one. For example, the volume control may have a current volume setting of 7. In which case, the audio signal is at −30 dB, and the downlink signal is at −12 dB. In some aspects, the controller may apply one or more scalar gain values to the signals in order for both signals to have those desired levels. In response to the volume control receiving a user-adjustment, the volume setting of the control may be reduced by one, to six. As a result, the controller may determine gain adjustments to the signals using the curve(s) 61 and/or 62 according to the new volume setting. In this case, the controller may reduce the signal level of the downlink signal by 10 dB, since the gain has dropped from −30 dB to −40 dB, and may reduce the signal level of the downlink signal by 4 dB, since the gain has dropped from approximately −12 dB to −16 dB.

Also shown, both curves 61 and 62 intersect at the maximum volume setting of ten. In which case, applied gains to both signals increases their respective signal levels to their respective maximum signal levels. In one aspect, at maximum signal levels, the signal level of the audio signal of the media content may be higher than the signal level of the downlink signal, since the audio signal may have originally been mastered higher than that of the downlink signal, as described herein.

In one aspect, the curves may have different slopes based on whether the volume control receives a user-adjustment to increase or decrease the overall volume level, as described herein. In another aspect, either of the curves may be different types of functions. For instance, the downlink curve 61 may be a linear function of gain with respect to volume settings, whereas the audio signal curve 62 may be a non-linear function of gain with respect to volume settings.

Figure 6:
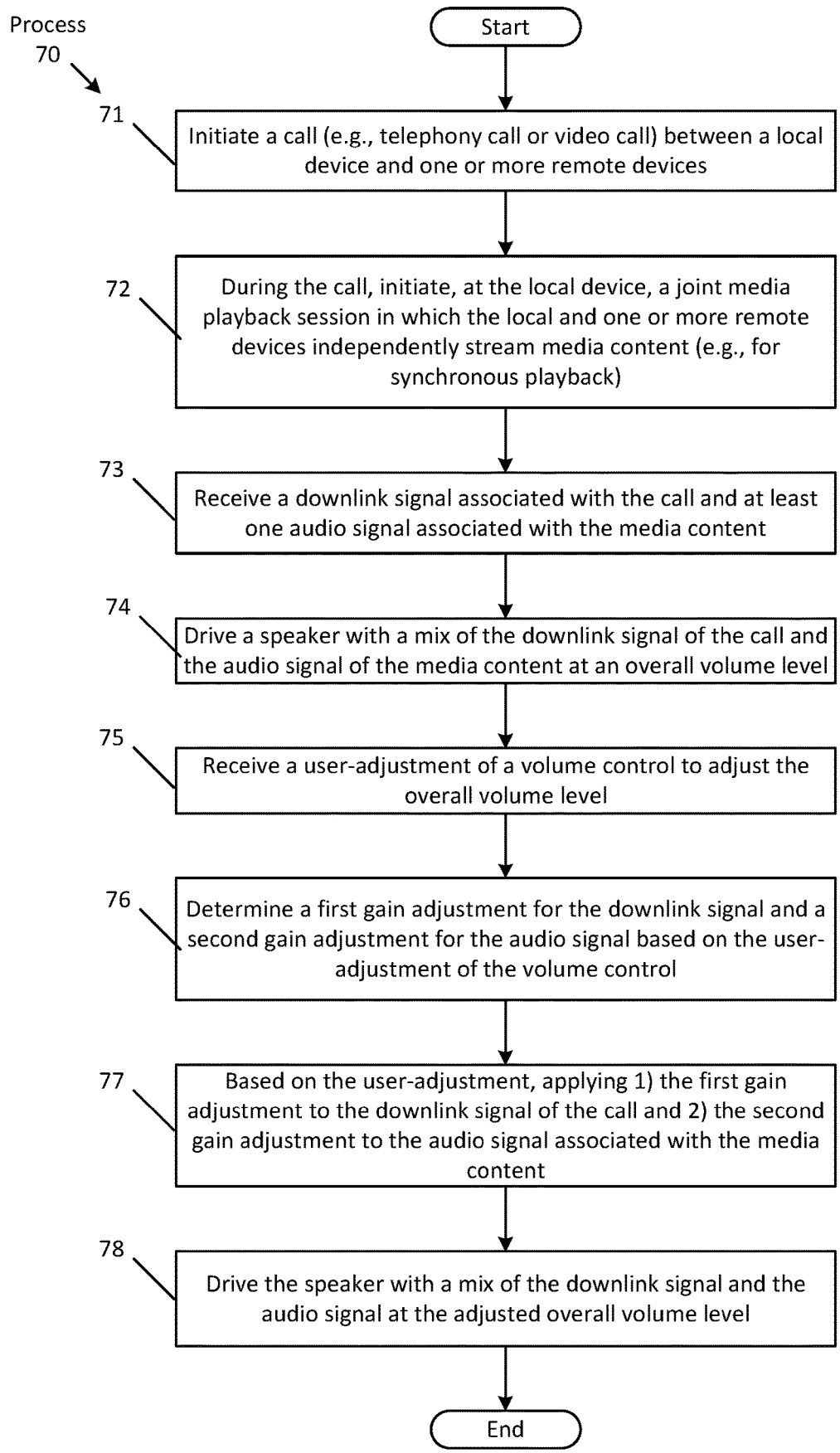
FIG. 6 is a flowchart of one aspect of a process for using a volume control to adjust the overall volume level of the audio system.

FIG. 6 is a flowchart of one aspect of a process 70 for using the (e.g., master) volume control 12 to adjust the overall volume level of the audio system 1. In one aspect, the process may be performed by (e.g., the controller 20 of) the local device 2 of the audio system 1. Specifically, at least some of the operations described herein may be performed by at least some of the operational blocks described in FIG. 4.

The process 70 begins by the controller 20 initiating a call (e.g., a telephony call or a video call) between the local device 2 and one or more remote devices 3 (at block 71). As described herein, the call may be initiated by the call manager 52 in response to receiving a request by the local user. In one aspect, the initiation of the call may be in response to receiving an incoming call from one or more remote devices. In which case, the call may be initiated by the call manager in response to the user accepting the call (e.g., via a user selection of a UI item of a telephony application for picking up a call that is displayed on display screen 25 when an incoming call signal is received from a remote device).

During the call, the controller 20 initiates, as the local device 2, a joint media playback session in which the local device and one or more remote devices independently stream media content for synchronous playback (at block 72). For example, the joint media playback session manager 47 may initiate the playback based on user input. In one aspect, the playback session may be between all of the devices that are conducting the call. In another aspect, the playback session may be initiated between the local device and at least some of the remote devices. In which case, when initiated the local user may define which remote devices are to participate. In some aspects, initiating the joint media playback session may be in response to the controller 20 receiving an initiation request from one or more of the remote devices and/or the media content server 5.

The controller receives at least one downlink (audio) signal associated with the call and at least one audio signal associated with the media content (at block 73). For example, the local device receives a downlink audio signal from at least some of the remote devices with which the local device is engaged in the call. In addition, the local device may receive audio data and/or image (or video) data associated with the media content of the playback session. For example, the media content may include only audio data (as one or more audio signals), such as being a musical composition that is to be played back simultaneously by the local and remote device(s). As another example, the media content may include audio and image (or video) data, such as being a movie. As yet another example, the media content may include other types of content, such as (e.g., user-interactive content like) a XR presentation (e.g., a virtual reality environment) or a video game. In which case, initiating the joint media playback session may include independently streaming image data of the XR presentation for display on display screen of the local device.

The controller 20 drives a speaker (e.g., speaker 22) with a mix of the downlink signal of the call and the audio signal of the media content at an overall volume level (at block 74). In one aspect, the controller may drive the speaker with the mix at a particular overall volume level. For instance, the speaker may be driven while the volume control is at a particular volume setting (e.g., at a volume setting of 7 out of 10). In some aspects, the controller may drive the speaker with the mix of signals prior to applying gain adjustments that are based on a determination of priority of signals, as described herein. As a result, the audio signal may have a greater signal level than a signal level of the downlink signal, as described herein.

In one aspect, the controller may spatially render the signals by applying one or more spatial filters according to spatial characteristics (e.g., elevation, azimuth, distance, etc.), such that which when outputted through one or more speaker drivers a 3D sound is produced (e.g., giving the user the perception that sounds are being emitted from a particular location within an acoustic space). In another aspect, the controller may transmit the (e.g., mix of the) signals to the audio output device 6 in order to drive one or more speakers (e.g., speaker 83) of the output device.

The controller receives a user-adjustment of a volume control (e.g., control 12) to adjust the overall volume level (at block 75). For example, the user could turn a control (e.g., digital crown or knob) on a device or make a certain gesture to reduce the volume. In response, the volume control may transmit a control signal to the controller 20 indicating that the volume setting of the volume control has been reduced.

The controller 20 determines a first gain adjustment for the downlink signal and a second gain adjustment for the audio signal based on the user-adjustment of the volume control (at block 76). Specifically, the controller may determine scalar gain values to be applied to one or both of the signals, as described herein. In one aspect, the first gain adjustment may be different than the second gain adjustment. For example, the volume-to-gain curve selector determines a priority between the downlink signal and the audio signal based on one or more criteria. As an example, the curve selector determines whether the VAD 53 detects speech (e.g., for a period of time) within the downlink audio signal. In response, the curve selector prioritizes the downlink audio signal higher than the audio signal, and based on this prioritization selects (e.g., different) volume-to-gain curves for each signal. In another aspect, the gain adjustments may be determined based on the streamed media content of the joint media playback session. For example, when the audio signal is associated with an object that is displayed on the display screen 25 of the local device, the controller may determine whether the local user is focusing (e.g., looking at) the object on the display screen. If so, the curve selector may determine that the local user wishes to prioritize that sound over the sound of the downlink audio signal.

Using the selected curves, the controller determines first and second gain adjustments for the signals that are associated with the adjusted (or changed) volume setting of the volume control. For example, referring to FIG. 5, when the volume setting is changed from 7 to 6, the controller may determine the first gain adjustment as a first attenuation of −4 dB and the second gain adjustment as a second attenuation of −10 dB. Thus, in this case, the second gain adjustment may be greater than the first gain adjustment, such that the signal level of the audio signal is reduced more than the signal level of the downlink signal, when applied.

Thus, based on the user-adjustment of the volume control, the controller applies 1) the first gain adjustment to the downlink signal of the call and 2) the second gain adjustment to the audio signal associated with the media content (at block 77). In which case, the gain-adjusted audio signal may be reduced more than the gain-adjusted downlink signal. As a result, the signal level of the gain-adjusted downlink signal may be greater than the signal level of the gain-adjusted audio signal, such that when both signals are used to drive the speaker sound of the downlink signal is emphasized more than sound of the audio signal. In another aspect, the gain adjustments may cause the signal levels of both gain-adjusted signals to be lower than the highest signal level of the signals prior to the adjustment, since the volume adjustment is reducing the overall volume level. As a result, in this example, the signal levels of both signals may be lower than the original signal level of the audio signal.

The controller then drives the speaker 22 with a mix of the (gain-adjusted) downlink signal and the (gain-adjusted) audio signal at the adjusted overall volume level (at block 78). In one aspect, the controller may perform spatial rendering of the signals by applying one or more spatial filters, as described herein. The spatial rendering of the signals may produce one or more driver signals, which the controller may use to drive one or more speakers of the local device (and/or the audio output device 6).

Some aspects may perform variations to the process 70. For example, the specific operations of at least some of the processes may not be performed in the exact order shown and described. The specific operations may not be performed in one continuous series of operations and different specific operations may be performed in different aspects. For example, at least some of the operations may be omitted. For example, the operations described at block 74 may be omitted, since controller may not drive the speaker prior to receiving the user-adjustment of the volume control. In which case, the controller may begin to drive the speaker after receiving user input.

As described in this process, the controller may determine different gain adjustments for the downlink signal and the audio signal based on a reduction of the overall volume level. In some aspects, the controller may perform similar operations upon receiving an increase in the overall volume level. For example, the controller may receive a second user-adjustment of the volume control to increase the overall volume level, which was previously reduced (e.g., from a volume setting of 7 to 6). For instance, the volume control may receive user input to increase the volume setting back to 7. In response, the controller may apply gains to the downlink audio signal and the audio signal that are proportional to the attentions that were previously applied to the signals in order to return their respective signal levels back to levels from prior to the original gain reduction.

In another aspect, the controller may perform at least some of the operations of process 70 in order to determine additional gain adjustments based on the increase of the overall volume level. In some aspects, the controller may determine different volume-to-gain curves when the overall volume level is increased, as opposed to when the overall volume level is decreased. As a result, the controller may determine a different gain adjustment for at least one signal (e.g., when the volume is increased back to the previous level). For instance, upon the user-adjustment increasing the volume level, the controller may apply a gain adjustment to the audio signal that increases the signal level of the audio signal more than the previous attenuation reduced a signal level of the audio signal when applied in response to the first user-adjustment.

In one aspect, the process 70 determines gain adjustments for two signals, a downlink audio signal of the call and an audio signal of the media content. In some aspects, at least some operations may be performed for determining (and applying) gain adjustments for two or more signals. As described herein, the media content may include a XR presentation with multiple sounds, where each sound is contained within an audio signal. For instance, the controller may receive two audios signal, where a first audio signal contains ambient sounds of the XR presentation and a second audio signal is associated with (e.g., includes sounds of) an object within the XR presentation. In some aspects, the controller may determine gain adjustments based on the object within the XR presentation. For example, the controller may determine that the user wants sound of the object displayed within the display screen to be emphasized over other sounds (e.g., using sensor data). In response to receiving a user-adjustment of the volume control to reduce the overall volume level, the controller may determine three gain adjustments, a first gain adjustment for the downlink audio signal, a second gain adjustment for the ambient sound, and a third gain adjustment for the second audio signal of the object. In one aspect, the first and second gain adjustments may attenuate their respective signals more than the third gain adjustment attenuates the second audio signal, such that when used to drive the speaker, the local user can (primarily) hear the sound of the object.

As described thus far, the controller may be configured to determine different gain adjustments for the downlink signal and the audio signal of the media content. In some aspects, the controller may determine the same gain adjustments for two or more signals that are to be used to drive the speaker. Specifically, upon determining that the local user does not want any sound emphasized other another, the controller may apply similar (or same) gain adjustments. For example, as described herein, the controller may determine different gain adjustments in response to the VAD detecting speech contained within the downlink signal. In response to determining that the microphone signal does not include speech (e.g., output of the VAD is in a low signal state), however, the controller may apply the same gain adjustments to the downlink signal and the audio signal of the media content. In some aspects, the same gain adjustments may be less (or reduce the signal levels of the signals less) than the gain adjustment that is applied to the audio signal when the controller determines that the downlink signal is to be emphasized. In some aspects, Once, however, speech is detected (or the controller determines that the user wishes the downlink signal to be emphasized), the controller may then determine and apply differing gain adjustments.

As described in process 70, the operations may be performed to determine a gain adjustment for the downlink signal associated with a remote device and an audio signal of streamed media content. In one aspect, the operations may be performed to determine multiple (e.g., two or more) gain adjustments for multiple downlink audio signals received from two or more remote devices. In some aspects, the controller may apply the same gain adjustments to the downlink signals, upon determining that one or more downlink signals have high priority. In another aspect, the controller may apply different gain adjustments to one or more downlink signals.

As previously described, the controller may prioritize sounds of some software applications based on an order at which they have been executed (or are currently being executed) by the local device, and therefore determine different gains to be applied to different sounds. For example, the audio signal may be associated with the media content from a media application that is currently being executed by the local device. Subsequently, the local user may execute another separate application (e.g., a messaging application). Upon receiving a user-adjustment of the volume control, the controller may attenuate sounds of the separate application more than an attenuation that is applied to sounds of the media application (e.g., by applying a higher gain value to an audio signal of the separate device and applying a gain value lower than the higher gain value to an audio signal of the media application). In another aspect, the controller may attenuate sounds of applications that have been executing longer (e.g., over a period of time), then sounds of applications that have been executing for lesser time (e.g., within the period of time).

In another aspect, the master volume control is a physical control that is a part of the first electronic device. In some aspects, the master volume control is a user interface (UI) item that is displayed on a display screen of the first electronic device. In one aspect, the single volume control is an input including a gesture made by a user of the first electronic device.

In one aspect, the single volume control includes several volume settings, each volume setting defining a different overall volume level of the first electronic device, the user-adjustment at the single volume control changes a current volume setting of the signal volume control to a new volume setting that is associated with the reduced overall volume level. In some aspects, the downlink signal is associated with a first volume-to-gain curve that associates the plurality of volume settings to a first plurality of gains and the audio signal of the media content is associated with a second volume-to-gain curve that associates the plurality of volume settings to a second plurality of gains, the method further includes, in response to receiving the user-adjustment, using the first volume-to-gain curve to determine the first gain adjustment based on a first gain that is associated with the new volume setting, and using the second volume-to-gain curve to determine the second gain adjustment based on a second gain that is associated with the new volume setting. In some aspects, the first and second volume-to-gain curves are linear functions of gain with respect to the plurality of volume settings of the single volume control, the first volume-to-gain curve has a greater slope than a slope of the second volume-to-gain curve such that at each volume setting a gain on the first volume-to-gain curve is lower than a gain on the second volume-to-gain curve. In one aspect, the first and second volume-to-gain curves are non-linear functions of gain with respect to volume settings of the single volume control.

In another aspect, the user-adjustment is a first user-adjustment, the first gain adjustment is a first attenuation, and the second gain adjustment is a second attenuation, the method further includes receiving a second user-adjustment of the single volume control for the first electronic device to increase the reduced overall volume level back to the overall volume level; applying 1) a first gain to the gain-adjusted downlink signal and 2) a second gain to the gain-adjusted audio signal, the first and second gains increase signals levels of the gain-adjusted downlink signal and audio signal, respectively. In one aspect, the first gain is proportional to the first attenuation and the second gain is proportional to the second attenuation. In another aspect, the second gain increases a signal level of the gain-adjusted audio signal more than the second attenuation reduced a signal level of the audio signal when applied in response to receiving the first user-adjustment. In some aspects, when the second user-adjustment of the single volume control increases the overall volume level of the first electronic device to a maximum volume level, the applied second gain increases the signal level of the gain-adjusted audio signal higher than the applied first gain increase the signal level of the gain-adjusted downlink signal.

In some aspects, determining the first and second gain adjustments includes using the user-adjustment at the single volume control to perform a table lookup into a data structure that associates, for different user-adjustments, a gain for the downlink signal and a gain for the audio signal of the streamed media content. In some aspects, the method further includes, in response to determining that the microphone signal does not include speech the first and second gain adjustments are the same.

In one aspect, the application of the first and second gain adjustments reduce signal levels of the downlink signal and audio signal, respectively, the method further includes prior to receiving the user-adjustment, determining whether the downlink signal of the call includes speech based on output from a voice activity detector (VAD); and in response to determining that the downlink signal includes speech, applying a third gain adjustment to the audio signal to reduce a signal level of the audio signal. In another aspect, the second gain adjustment reduces the signal level of the audio signal more when the downlink signal includes speech than when the downlink signal does not include speech. In some aspects, the downlink signal is a first downlink signal, the method further includes while engaged in the call and the joint media playback session with the second electronic device and a third electronic device, receiving the first downlink signal from the second electronic device, a second downlink signal from the third electronic device, and the audio signal of the media content; in response to the user-adjustment, applying the first gain adjustment to the first downlink signal, the second gain adjustment to the audio signal, and a third gain adjustment to the second downlink signal, the third gain adjustment adjusts a signal level of the second downlink signal differential than the first gain adjustment adjusts a signal level of the first downlink signal.

In one aspect, the call is initiated by a telephony application that is being executed by the first electronic device, the audio signal is a first audio signal from a media application that is being executed by the first electronic device that, the method further includes receiving a second audio signal from a separate application that is being executed by the first electronic device; determining the first gain adjustment, the second gain adjustment, and a third gain adjustment to be applied to the downlink signal, the first audio signal, and the second audio signal, respectively, based on an order of which the first electronic device begins to execute the telephony application, the media application, and the separate application. In another aspect, the second audio signal is attenuated less than at least one of the first audio signal and the downlink signal.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least one of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by a first electronic device, the method comprising:
   while engaged in a call with a second electronic device, initiating a joint media playback session in which the first electronic device and the second electronic device independently stream media content for synchronous playback;
   driving a speaker with a mix of a downlink signal of the call and an audio signal of the media content at an overall volume level;
   receiving a user-adjustment at a single volume control for the first electronic device to reduce the overall volume level; and
   in response to the user-adjustment,
      determining a time period that extends from before the user-adjustment is received to at least when the user-adjustment is received in which a microphone signal of a microphone has included speech;
      responsive to the time period being greater than a threshold, determining a first gain and a second gain based on the user-adjustment;
      responsive to the time period being less than the threshold, determining a third gain and a fourth gain, wherein the first gain is less than the third gain and the fourth gain is less than the second gain;
      applying 1) the first gain or the third gain to the downlink signal and 2) the second gain or the fourth gain to the audio signal based on whether the time period is greater than or less than the threshold, respectively; and
      driving the speaker with a mix of the downlink signal and the audio signal at the reduced volume level.

2. The method of claim 1, wherein the single volume control is a master volume control of the first electronic device that is configured to provide bi-directional control for either incrementally increasing or decreasing the overall volume level.

3. The method of claim 1,
   wherein prior to the applying of the first gain and second gain, the audio signal has a greater signal level than a signal level of the downlink signal,
   wherein the second gain is greater than the first gain such that 1) a signal level of a gain-adjusted audio signal and a signal level of a gain-adjusted downlink signal are lower than the signal level of the downlink signal and 2) the signal level of the gain-adjusted downlink signal is greater than the signal level of the gain-adjusted audio signal.

4. The method of claim 1 further comprising determining each gain based at least partially on the streamed media content of the joint media playback session.

5. The method of claim 1 further comprising:
   responsive to the time period being greater than the threshold, determining a first volume curve for the downlink signal and a second volume curve for the audio signal, wherein the first gain and the second gain are determined using the first volume curve and the second volume curve, respectively; and
   responsive to the time period being less than the threshold, determining a third volume curve for the downlink signal and a fourth volume curve for the audio signal, wherein the third gain and the fourth gain are determined using the third volume curve and the fourth volume curve, respectively.

6. The method of claim 5, wherein at least one volume curve is different than at least one other volume curve.

7. The method of claim 1, wherein the first electronic device is executing a plurality of software applications that comprises at least a telephony application that is performing the call and a media application that is performing the joint media playback session, wherein each gain is determined based at least partially on the telephony application or the media application.

8. A first electronic device, comprising:
a sensor;
a speaker;
a processor; and
non-transitory machine-readable medium having instructions which when executed by the processor causes the first electronic device to:
while engaged in a call with a second electronic device, initiate a joint media playback session in which the first and second electronic devices independently stream media content for synchronous playback,
drive the speaker with a mix of a downlink signal of the call and an audio signal of the media content at an overall volume level,
receive sensor data from the sensor of the first electronic device,
determine, based on the sensor data, that the downlink signal comprises a first priority and that the audio signal of the media content comprises a second priority that is different than the first priority,
determine a first rate of change for a downlink volume level of the downlink signal based on the first priority and a second rate of change for a media content volume level of the audio signal based on the first and second priorities,
receive at least two user-adjustments at a single volume control for the first electronic device to reduce the overall volume level at least twice, and
in response to each user-adjustment, decrease the downlink volume level of the downlink signal at the first rate of change and the media content volume level of the audio signal at the second rate of change.

9. The first electronic device of claim 8, wherein the single volume control is a master volume control of the first electronic device that is configured to provide bi-directional control for either incrementally increasing or decreasing the overall volume level.

10. The first electronic device of claim 8,
wherein prior to the decreasing of a first user-adjustment, the media content level is higher than the downlink volume level,
wherein the first rate of change is lower than the second rate of change such that 1) a decreased downlink volume level and a decreased media content volume level are lower than the downlink volume level of the downlink signal and 2) the decreased downlink volume level is higher than the decreased media content volume level.

11. The first electronic device of claim 8, wherein the non-transitory machine-readable medium has further instructions to, in response to each user-adjustment, determine a first gain adjustment based on the first rate of change and a second gain adjustment based on the second rate of change, wherein the decrease comprises instructions to apply the first and second gain adjustments to the downlink audio signal and audio signal, respectively.

12. The first electronic device of claim 8, wherein the sensor comprises a microphone and the sensor data comprises a microphone signal, wherein the non-transitory machine-readable medium has further instructions to determine whether the microphone signal produced by the microphone of the first electronic device includes speech of a user of the first electronic device based on output from a voice activity detector (VAD),
wherein the decrease is performed in response to determining that the microphone signal includes the speech.

13. The first electronic device of claim 12, wherein the first and second priorities are determined based on the microphone including speech for a period of time before the user-adjustment is received at the volume control.

14. The first electronic device of claim 8, wherein the sensor comprises a camera and the sensor data comprises one or more images, wherein the instructions to determine that the downlink signal comprises the first priority and that the audio signal comprises the second priority is based on determining that a user of the first electronic device is performing a gesture based on the one or more images.

15. A non-transitory machine-readable medium having instructions which when executed by at least one processor of a first electronic device causes the first electronic device to:
while the first electronic device is engaged in a call with a second electronic device, initiate a joint media playback session in which the first electronic device and the second electronic device independently stream media content for synchronous playback;
drive a speaker with a mix of a downlink signal of the call and an audio signal of the media content at an overall volume level;
receive a user-adjustment at a single volume control for the first electronic device to reduce the overall volume level; and
in response to the user-adjustment,
determine a time period that extends from before the user-adjustment is received to at least when the user-adjustment is received in which a microphone signal of a microphone has included speech;
responsive to the time period being greater than a threshold, determine a first gain and a second gain based on the user-adjustment;
responsive to the time period being less than the threshold, determine a third gain and a fourth gain, wherein the first gain is less than the third gain and the fourth gain is less than the second gain;
apply 1) the first gain or the third gain to the downlink signal and 2) the second gain or the fourth gain to the audio signal based on whether the time period is greater than or less than the threshold, respectively; and
drive the speaker with a mix of the downlink signal and the audio signal at the reduced volume level.

16. The non-transitory machine-readable medium of claim 15, wherein the single volume control is a master volume control of the first electronic device that is configured to provide bi-directional control for either incrementally increasing or decreasing the overall volume level.

17. The non-transitory machine-readable medium of claim 15 comprises further instructions to determine each gain based at least partially on the streamed media content of the joint media playback session.

18. The non-transitory machine-readable medium of claim 15 comprises further instructions to:
- responsive to the time period being greater than the threshold, determine a first volume curve for the downlink signal and a second volume curve for the audio signal, wherein the first gain and the second gain are determined using the first volume curve and the second volume curve, respectively; and
- responsive to the time period being less than the threshold, determine a third volume curve for the downlink signal and a fourth volume curve for the audio signal, wherein the third gain and the fourth gain are determined using the third volume curve and the fourth volume curve, respectively.

19. The non-transitory machine-readable medium of claim 18, wherein at least one volume curve is different than at least one other volume curve.

20. The non-transitory machine-readable medium of claim 15, wherein the first electronic device is executing a plurality of software applications that comprises at least a telephony application that is performing the call and a media application that is performing the joint media playback session, wherein each gain is determined based at least partially on the telephony application or the media application.

* * * * *